US012684391B2

(12) United States Patent
Kazmi et al.

(10) Patent No.: US 12,684,391 B2
(45) Date of Patent: Jul. 14, 2026

(54) MOBILITY MEASUREMENT REPORTING FOR XR SERVICES

(71) Applicant: Telefonaktiebolaget LM Ericsson (publ), Stockholm (SE)

(72) Inventors: Muhammad Ali Kazmi, Sundbyberg (SE); Du Ho Kang, Sollentuna (SE); Jose Luis Pradas, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 282 days.

(21) Appl. No.: 18/262,290

(22) PCT Filed: Dec. 20, 2021

(86) PCT No.: PCT/EP2021/086741
§ 371 (c)(1),
(2) Date: Jul. 20, 2023

(87) PCT Pub. No.: WO2022/194415
PCT Pub. Date: Sep. 22, 2022

(65) Prior Publication Data
US 2024/0114367 A1     Apr. 4, 2024

Related U.S. Application Data

(60) Provisional application No. 63/162,886, filed on Mar. 18, 2021.

(51) Int. Cl.
*H04W 24/08*     (2009.01)
*H04W 24/10*     (2009.01)
(Continued)

(52) U.S. Cl.
CPC ........... *H04W 24/10* (2013.01); *H04W 24/08* (2013.01); *H04W 72/512* (2023.01);
(Continued)

(58) Field of Classification Search
CPC ........... H04B 17/0082–409; H04W 24/02–10; H04W 36/0005–385; H04W 72/02–569;
(Continued)

(56) References Cited

U.S. PATENT DOCUMENTS

| | | | |
|---|---|---|---|
| 2017/0026861 A1 | 1/2017 | Tseng et al. | |
| 2021/0120575 A1* | 4/2021 | Yang ..................... | H04W 24/10 |
| 2023/0125945 A1* | 4/2023 | Yin ........................ | H04W 24/10 |

FOREIGN PATENT DOCUMENTS

| | | |
|---|---|---|
| EP | 2666332 B1 | 4/2019 |
| WO | 2014205678 A1 | 12/2014 |

(Continued)

OTHER PUBLICATIONS

"3GPP TR 23.758 V17.0.0", 3rd Generation Partnership Project; Technical Specification Group Services and System Aspects; Study on application architecture for enabling Edge Applications; (Release 17), Dec. 2019, pp. 1-74.

(Continued)

*Primary Examiner* — Timothy J Weidner
(74) *Attorney, Agent, or Firm* — Murphy, Bilak & Homiller, PLLC

(57)     ABSTRACT

Embodiments include methods for a user equipment (UE) configured to communicate data corresponding to multiple traffic types with a network node of a wireless network. Such methods include determining a traffic type associated with data communicated between the UE and the network node and selecting a measurement configuration based on the determined traffic type. The selected measurement configuration includes values, of at least one parameter, that are associated with the determined traffic type. Such methods also include performing one or more measurements on downlink (DL) signals from the wireless network according to the selected measurement configuration. Other embodi- (Continued)

ments include complementary methods for a network node, as well as UEs and network nodes configured to perform such methods.

17 Claims, 8 Drawing Sheets

(51) Int. Cl.
| | |
|---|---|
| *H04W 72/512* | (2023.01) |
| *H04W 72/566* | (2023.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC .......... *H04W 72/569* (2023.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ..... H04W 84/02–16; H04W 88/02–12; H04W 92/02–04; H04W 92/10
See application file for complete search history.

(56) References Cited

FOREIGN PATENT DOCUMENTS

| WO | 2016032709 A1 | 3/2016 |
|---|---|---|
| WO | 2020041990 A1 | 3/2020 |
| WO | 2020249116 A1 | 12/2020 |

OTHER PUBLICATIONS

"3GPP TS 23.501 V17.0.0", 3rd Generation Partnership Project; Technical Specification Group Services and System Aspects; System architecture for the 5G System (5GS); Stage 2 (Release 17), Mar. 2021, pp. 1-489.

"3GPP TS 38.211 V16.4.0", 3rd Generation Partnership Project; Technical Specification Group Radio Access Network; NR; Physical channels and modulation (Release 16), Dec. 2020, pp. 1-43.

"Views on potential enhancements for XR", 3GPP TSG-RAN WG1 Meeting #104-e, R1-2101367, e-Meeting, Jan. 25-Feb. 5, 2021, pp. 1-4.

"3GPP TS 38.331 V16.3.1", 3rd Generation Partnership Project; Technical Specification Group Radio Access Network; NR; Radio Resource Control (RRC) protocol specification (Release 16), Jan. 2021, pp. 1-932.

"New SID on XR Evaluations for NR", 3GPP TSG RAN Meeting, #86 RP-193241, Sitges, Spain, Dec. 9-12, 2019, pp. 1-6.

* cited by examiner

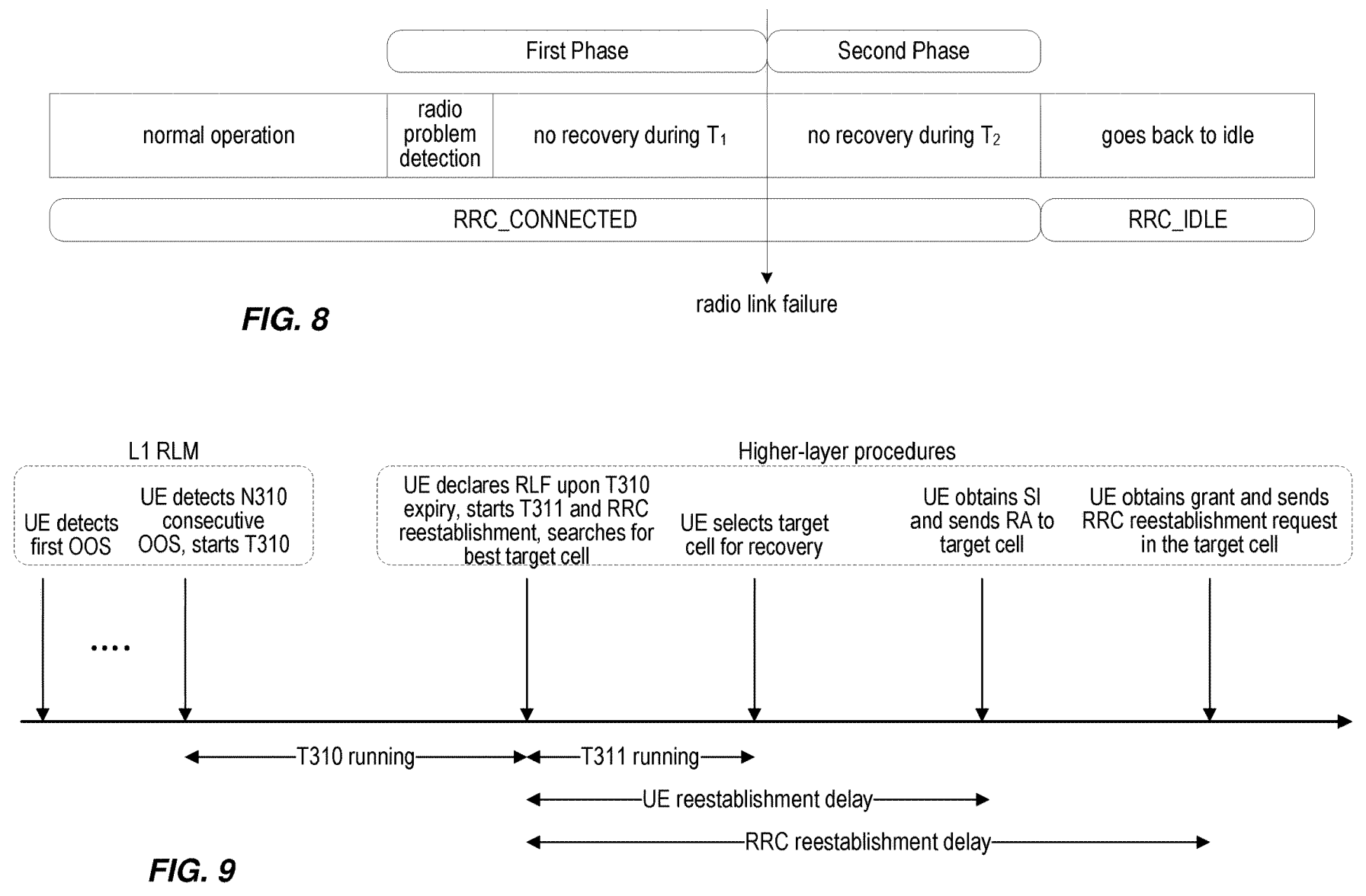

| First Phase | | Second Phase | |
|---|---|---|---|
| normal operation | radio problem detection | no recovery during $T_1$ | no recovery during $T_2$ | goes back to idle |

RRC_CONNECTED

RRC_IDLE radio link failure

FIG. 8

Higher-layer procedures

UE declares RLF upon T310 expiry, starts T311 and RRC reestablishment, searches for best target cell UE selects target cell for recovery UE obtains SI and sends RA to target cell UE obtains grant and sends RRC reestablishment request in the target cell

L1 RLM

UE detects first OOS

UE detects N310 consecutive OOS, starts T310

— T310 running —

— T311 running —

— UE reestablishment delay —

— RRC reestablishment delay —

FIG. 9

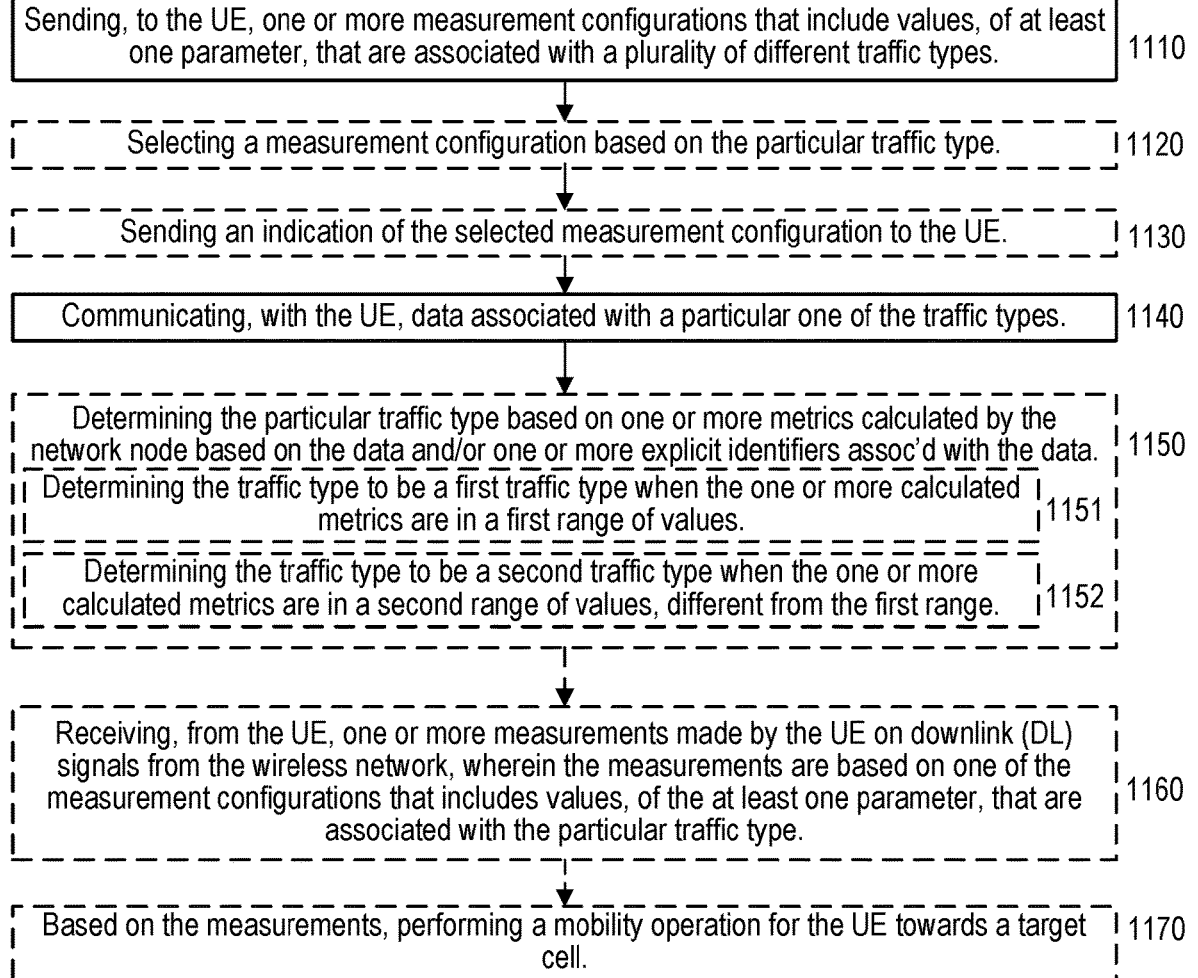

Sending, to the UE, one or more measurement configurations that include values, of at least one parameter, that are associated with a plurality of different traffic types.   1110

Selecting a measurement configuration based on the particular traffic type.   1120

Sending an indication of the selected measurement configuration to the UE.   1130

Communicating, with the UE, data associated with a particular one of the traffic types.   1140

Determining the particular traffic type based on one or more metrics calculated by the network node based on the data and/or one or more explicit identifiers assoc'd with the data.   1150

Determining the traffic type to be a first traffic type when the one or more calculated metrics are in a first range of values.   1151

Determining the traffic type to be a second traffic type when the one or more calculated metrics are in a second range of values, different from the first range.   1152

Receiving, from the UE, one or more measurements made by the UE on downlink (DL) signals from the wireless network, wherein the measurements are based on one of the measurement configurations that includes values, of the at least one parameter, that are associated with the particular traffic type.   1160

Based on the measurements, performing a mobility operation for the UE towards a target cell.   1170

*FIG. 11*

MOBILITY MEASUREMENT REPORTING FOR XR SERVICES

TECHNICAL FIELD

The present disclosure relates generally to wireless communication networks, and more specifically to techniques for mobility of wireless devices that use applications needing guaranteed low latency, such as extended reality (XR) and cloud gaming.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases.

FIG. 1 illustrates an exemplary high-level view of the 5G network architecture, consisting of a Next Generation RAN (NG-RAN) 199 and a 5G Core (5GC) 198. NG-RAN 199 can include a set of gNodeB's (gNBs) connected to the 5GC via one or more NG interfaces, such as gNBs 100, 150 connected via interfaces 102, 152, respectively. In addition, the gNBs can be connected to each other via one or more Xn interfaces, such as Xn interface 140 between gNBs 100 and 150. With respect the NR interface to UEs, each of the gNBs can support frequency division duplexing (FDD), time division duplexing (TDD), or a combination thereof.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," with the term AMF being discussed in more detail below.

The NG RAN logical nodes shown in FIG. 1 include a central (or centralized) unit (CU or gNB-CU) and one or more distributed (or decentralized) units (DU or gNB-DU). For example, gNB 100 includes gNB-CU 110 and gNB-DUs 120 and 130. CUs (e.g., gNB-CU 110) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 122 and 132 shown in FIG. 1. The gNB-CU and connected gNB-DUs are only visible to other gNBs and the 5GC as a gNB. In other words, the F1 interface is not visible beyond gNB-CU.

FIG. 2 shows a high-level view of an exemplary 5G network architecture, including a Next Generation Radio Access Network (NG-RAN) 299 and a 5G Core (5GC) 298.

As shown in the figure, NG-RAN 299 can include gNBs 210 (e.g., 210a,b) and ng-eNBs 220 (e.g., 220a,b) that are interconnected with each other via respective Xn interfaces. The gNBs and ng-eNBs are also connected via the NG interfaces to 5GC 298, more specifically to the Access and Mobility Management Function (AMF, e.g., 230a,b) via respective NG-C interfaces and to the User Plane Function (UPF, e.g., 240a,b) via respective NG-U interfaces. Moreover, the AMFs 230a,b can communicate with one or more policy control functions (PCFs, e.g., 250a,b) and network exposure functions (NEFs, e.g., 260a,b).

Each of the gNBs 210 can support the NR radio interface including frequency division duplexing (FDD), time division duplexing (TDD), or a combination thereof. Each of ng-eNBs 220 can support the fourth-generation (4G) Long-Term Evolution (LTE) radio interface. Unlike conventional LTE eNBs, however, ng-eNBs 220 connect to the 5GC via the NG interface. Each of the gNBs and ng-eNBs can serve a geographic coverage area including one or more cells, such as cells 211a-b and 221a-b shown in FIG. 2. Depending on the cell in which it is located, a UE 205 can communicate with the gNB or ng-eNB serving that cell via the NR or LTE radio interface, respectively. Although FIG. 2 shows gNBs and ng-eNBs separately, it is also possible that a single NG-RAN node provides both types of functionality.

To support UE mobility operations such as handover and cell reselection, the NG-RAN can configure a UE to perform measurements on various carrier frequencies and various radio access technologies (RATs) corresponding to neighbor cells. The configuration for each of these measurements is referred to as a "measurement object." Furthermore, the UE can be configured to perform the measurements according to a "measurement gap pattern" (or "gap pattern" for short), which can include a measurement gap repetition period (MGRP, i.e., how often a recurring gap is available for measurements) and a measurement gap length (MGL, i.e., the length of each recurring gap). The network can configure UE measurement reports to be periodic (e.g., every 640 ms) or aperiodic based a particular event (e.g., when a measured quantity exceeds or falls below a predetermined threshold).

Extended Reality (XR) and cloud gaming are some of the most important 5G media applications under consideration. XR is an umbrella term that refers to all real-and-virtual combined environments and human-machine interactions generated by computer technology and wearables. It includes exemplary forms such as Augmented Reality (AR), Mixed Reality (MR), and Virtual Reality (VR), as well as various other types that span or sit between these examples. In the following, the term "XR" also refers to cloud gaming and related applications.

In general, XR services require relatively high throughput (e.g., data rates) and relatively low latency, compared to certain other services. From 3GPP Rel-15, the 5G NR radio interface is designed to support applications demanding high throughput and low latency in line with these requirements.

SUMMARY

However, conventional measurement reporting techniques for mobility operations (e.g., handover) are not suitable for UEs using XR services. Given the importance of XR services, improvements are needed to address these problems, issues, and/or difficulties.

Embodiments of the present disclosure provide specific improvements to communication between user equipment (UE) and network nodes in a wireless network, such as by providing, enabling, and/or facilitating solutions to overcome exemplary problems summarized above and described in more detail below.

Embodiments include methods (e.g., procedures) for a user equipment (UE) configured to communicate data corresponding to multiple traffic types with a network node of a wireless network (e.g., NG-RAN).

These exemplary methods can include determining a traffic type associated with data communicated between the UE and the network node. The communicated data can be UL data and/or DL data. The traffic type can be determined based on data currently being communicated, previously communicated, an/or expected to be communicated. These exemplary methods can also include selecting a measurement configuration based on the determined traffic type. The selected measurement configuration includes values, of at least one parameter, that are associated with the determined traffic type. These exemplary methods can also include performing one or more measurements (e.g., RRM measurements) on DL signals from the wireless network according to the selected measurement configuration.

In some embodiments, performing the one or more measurements in block 1040 can include the operations of sub-block 1041, where the UE can perform at least one operation based on the value (or values, i.e., of the at least one parameter) associated with the determined traffic type. In various embodiments, the at least one operation performed in sub-block 1041 based on the value associated with the determined traffic type can include any of the following:

initiating a measurement based on an event corresponding to the values, of the at least one parameter, that are associated with the determined traffic type;

reporting a measurement to the wireless network based on an event corresponding to the values, of the at least one parameter, that are associated with the determined traffic type; and periodically reporting a measurement to the wireless network based on a periodicity corresponding to the values, of the at least one parameter, that are associated with the determined traffic type.

In some embodiments, these exemplary methods can also include receiving, from the wireless network, one or more measurement configurations that include values, of the at least one parameter, that are associated with a plurality of different traffic types. In such case, the measurement configuration is selected from the one or more received measurement configurations.

In some of these embodiments, the one or more measurement configurations can include a single measurement configuration including a plurality of different values, of the at least one parameter, that are associated with a respective plurality of traffic types. In other of these embodiments, the one or more measurement configurations can include a plurality of measurement configurations having a respective plurality of different values, of the at least one parameter, that are associated with a respective plurality of traffic types.

In some embodiments, the plurality of traffic types include enhanced mobile broadband (eMBB) service and extended reality (XR) service. Each parameter, of the at least one parameter, includes respective values that are associated with the eMBB service and the XR service.

In other embodiments, the plurality of traffic types include a plurality of different extended XR services. Each parameter, of the at least one parameter, includes respective values that are associated with the respective plurality of different XR services. In some variants, the multiple traffic types can also include eMBB service, such that each parameter, of the at least one parameter, includes a further value that is associated with the eMBB service.

In some embodiments, determining the traffic type can be based on one or more metrics calculated by the UE based on the data and/or on one or more explicit identifiers associated with the data. In some of these embodiments, the determining the traffic type can determining the traffic type to be a first traffic type (e.g., eMBB) when the one or more calculated metrics are in a first range of values; and determining the traffic type to be a second traffic type (e.g., XR) when the one or more calculated metrics are in a second range of values, the second range being different than (e.g., partially- or non-overlapping with) the first range.

In some of these embodiments, the calculated metrics can include any of the following: data rate metrics, traffic pattern metrics, and quality-of-service (QoS) metrics. In some embodiments, the traffic pattern metrics can include one or more statistics for any of the following over a previous duration: number of data packets communicated; inter-arrival time of data packets communicated; size of data packets communicated; and radio resource utilization.

In some embodiments, the data rate metrics can include one or more data rate statistics for any of the following over a previous duration: the UE; a service provided by the UE; one or more data radio bearers (DRB); and one or more logical channels (LCH).

In some embodiments, the QoS metrics can include one or more statistics for any of the following over a previous duration: physical-layer (PHY) block error rate (BLER), transport BLER, frame error rate (FER), packet loss rate, and timing of successfully received protocol data units (PDUs) or packets.

In some embodiments, the explicit identifiers associated with the data include any of the following: the traffic type; one or more data radio bearers (DRB); one or more logical channels (LCH); and one or more QoS flows (QFI).

Other embodiments include exemplary methods (e.g., procedures) for a network node configured to communicate data corresponding to multiple traffic types with a UE in a wireless network (e.g., NG-RAN). These embodiments are complementary to UE embodiments summarized above.

These exemplary methods can include sending, to the UE, one or more measurement configurations that include values, of at least one parameter, that are associated with a plurality of different traffic types. These exemplary methods can also include communicating, with the UE, data associated with a particular traffic type. The data can be UL data and/or DL data.

In some embodiments, these exemplary methods can also include receiving, from the UE, one or more measurements made by the UE on DL signals from the wireless network. In particular, the measurements can be based on one of the measurement configurations that includes values, of the at least one parameter, that are associated with the particular traffic type. In some of these embodiments, one or more of the following are based on the values, of the at least one parameter, that are associated with the particular traffic type:

an event when the received measurements were initiated by the UE;

an event when the received measurements were sent by the UE; and a periodicity at which the measurements are received.

In some embodiments, these exemplary methods can also include selecting a measurement configuration based on the particular traffic type. The selected measurement configuration includes the values, of the at least one parameter, that are associated with the particular traffic type. These exemplary methods can also include sending an indication of the selected measurement configuration to the UE.

In some embodiments, these exemplary methods can also include, based on the measurements, performing a mobility operation for the UE towards a target cell.

In some of these embodiments, the one or more measurement configurations can include a single measurement configuration including a plurality of different values, of the at least one parameter, that are associated with a respective plurality of traffic types. In other of these embodiments, the one or more measurement configurations can include a plurality of measurement configurations having a respective plurality of different values, of the at least one parameter, that are associated with a respective plurality of traffic types.

In some embodiments, these exemplary methods can also include determining the particular traffic type for the data based on one or more metrics calculated by the network node based on the data and/or on one or more explicit identifiers associated with the data. In other words, the network node can determine the traffic type in a similar manner as summarized above for the UE embodiments.

In some of these embodiments, the calculated metrics can include any of the following: data rate metrics, traffic pattern metrics, and QoS metrics. In various embodiments, any of the data rate metrics. the traffic pattern metrics, and the QoS metric can be calculated in the same manner as corresponding metrics summarized above for the UE embodiments. In various embodiments, the explicit identifiers associated with the data can include any of the identifiers summarized above for the UE embodiments.

In various embodiments, the plurality of traffic types can include any of the traffic types and/or services summarized above for the UE embodiments.

Other embodiments include UEs (e.g., wireless devices) and network nodes (e.g., base stations, eNBs, gNBs, ng-eNBs, etc., or components thereof) configured to perform operations corresponding to any of the exemplary methods described herein. Other embodiments include non-transitory, computer-readable media storing program instructions that, when executed by processing circuitry, configure such UEs or network nodes to perform operations corresponding to any of the exemplary methods described herein.

These and other embodiments described herein can enhance mobility performance and/or service continuity for XR service users, such as by facilitating changes to a UE's serving cell before XR QoS/QoE becomes unacceptable, e.g., due to aggregate traffic load increase in the serving cell. These techniques can also facilitate reuse of existing handover procedures in the network albeit with improvements for use with emerging XR services.

These and other objects, features, and advantages of embodiments of the present disclosure will become apparent upon reading the following Detailed Description in view of the Drawings briefly described below.

BRIEF DESCRIPTION OF THE DRAWINGS

FIGS. 8-9 illustrate various aspects of user equipment (UE) operation associated with a radio link failure (RLF).

FIG. 11 shows a flow diagram of an exemplary method for a network node (e.g., base station, eNB, gNB, ng-eNB, etc.) of a wireless network (e.g., NG-RAN, E-UTRAN), according to various embodiments of the present disclosure.

DETAILED DESCRIPTION

Figure 1:
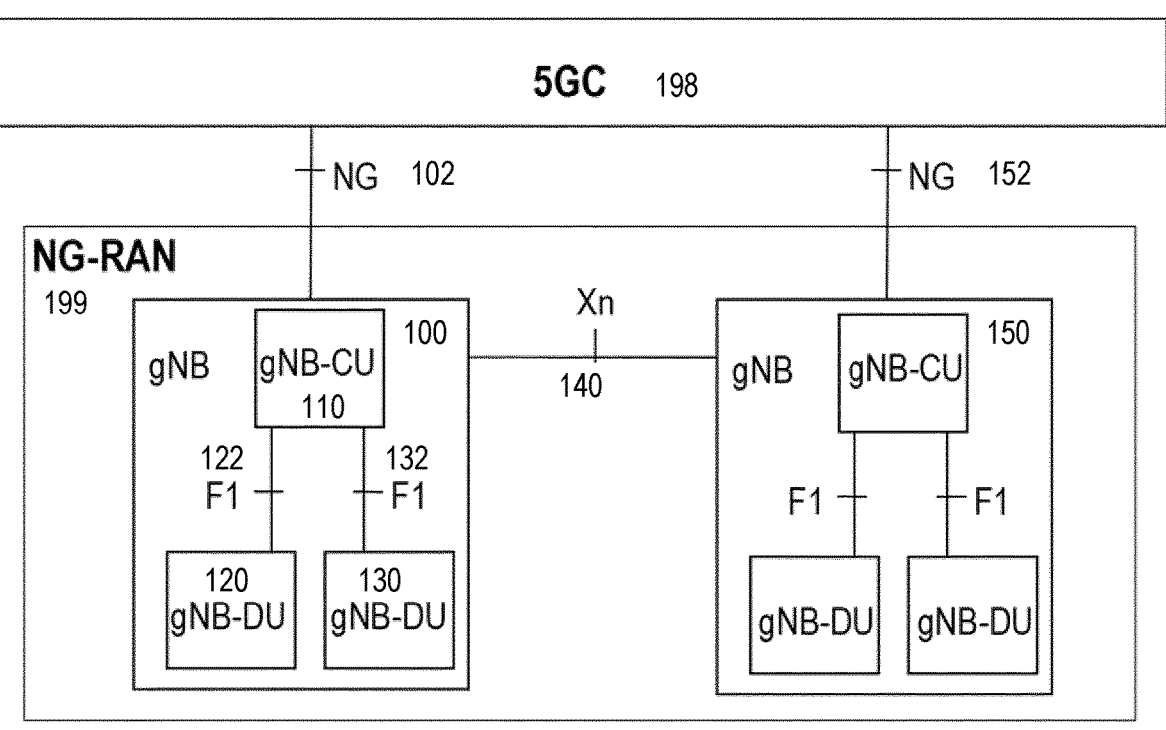
FIGS. 1-2 illustrate two high-level views of an exemplary 5G/NR network architecture.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where a step must necessarily follow or precede another step due to some dependency. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a radio access node or a wireless device."

Node: As used herein, a "node" can be a network node or a wireless device.

Radio Access Node: As used herein, a "radio access node" (or equivalently "radio network node," "radio access network node," or "RAN node") can be any node in a radio access network (RAN) of a cellular communications network that operates to wirelessly transmit and/or or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, existing measurement reporting techniques for mobility operations (e.g., handover) in 5G/NR networks are not suitable for UEs using XR services. Given the importance of XR services, improvements are needed to address these problems, issues, and/or difficulties. This is discussed in more detail below, after a brief introduction to characteristics of 5G/NR and XR services.

5G/NR technology shares many similarities with fourth-generation LTE. For example, NR uses CP-OFDM (Cyclic Prefix Orthogonal Frequency Division Multiplexing) in the DL and both CP-OFDM and DFT-spread OFDM (DFT-S-OFDM) in the UL. As another example, in the time domain, NR DL and UL physical resources are organized into equal-sized 1-ms subframes. A subframe is further divided into multiple slots of equal duration, with each slot including multiple OFDM-based symbols. An NR slot can include 14 OFDM symbols for normal cyclic prefix and 12 symbols for extended cyclic prefix. A resource block (RB) consists of a group of 12 contiguous OFDM subcarriers for a duration of a 12- or 14-symbol slot. A resource element (RE) corresponds to one OFDM subcarrier during one OFDM symbol interval.

In 3GPP Release-15 (Rel-15), an NR UE can be configured with up to four carrier bandwidth parts (BWPs) in the DL with a single DL BWP being active at a given time. A UE can be configured with up to four BWPs in the UL with a single UL BWP being active at a given time. If a UE is configured with a supplementary UL (SUL), the UE can be configured with up to four additional BWPs in the SUL, with a single SUL BWP being active at any time.

Common RBs (CRBs) are numbered from 0 to the end of the carrier bandwidth. Each BWP configured for a UE has a common reference of CRB0, such that a configured BWP may start at a CRB greater than zero. CRB0 can be identified by one of the following parameters provided by the network, as further defined in 3GPP TS 38.211 section 4.4:

PRB-index-DL-common for DL in a primary cell (PCell, e.g., PCell or PSCell);

PRB-index-UL-common for UL in a PCell;

PRB-index-DL-Dedicated for DL in a secondary cell (SCell);

PRB-index-UL-Dedicated for UL in an SCell; and

PRB-index-SUL-common for a supplementary UL.

In this manner, a UE can be configured with a narrow BWP (e.g., 10 MHz) and a wide BWP (e.g., 100 MHz), each starting at a particular CRB, but only one BWP can be active for the UE at a given point in time. Within a BWP, PRBs are defined and numbered in the frequency domain from 0 to $$N_{BWPi}^{size} - 1,$$

where i is the index of the particular BWP for the carrier.

NR supports various SCS values $\Delta f=(15 \times 2^{\mu})$ kHz, where $\mu \in (0,1,2,3,4)$ are referred to as "numerologies." Numerology $\mu=0$ (i.e., $\Delta f=15$ kHz) provides the basic (or reference) SCS that is also used in LTE. The symbol duration, cyclic prefix (CP) duration, and slot duration are inversely related to SCS or numerology. For example, there is one (1-ms) slot per subframe for $\Delta f=15$ kHz, two 0.5-ms slots per subframe for $\Delta f=30$ kHz, etc. In addition, the maximum carrier bandwidth is directly related to numerology according to $2^{\mu}*50$ MHz. Table 1 below summarizes the supported NR numerologies and associated parameters. Different DL and UL numerologies can be configured by the network.

TABLE 1

| μ | $\Delta f =$ $2^\mu \cdot$ 15 (kHz) | Cyclic prefix (CP) | CP dura- tion | Sym- bol dura- tion | Sym- bol + CP | Slot dura- tion | Max carrier BW |
|---|---|---|---|---|---|---|---|
| 0 | 15 | Normal | 4.69 μs | 66.67 μs | 71.35 μs | 1 ms | 50 MHz |
| 1 | 30 | Normal | 2.34 μs | 33.33 μs | 35.68 μs | 0.5 ms | 100 MHz |
| 2 | 60 | Normal, Extended | 1.17 μs | 16.67 μs | 17.84 μs | 0.25 ms | 200 MHz |
| 3 | 120 | Normal | 0.59 μs | 8.33 μs | 8.92 μs | 125 μs | 400 MHz |
| 4 | 240 | Normal | 0.29 μs | 4.17 μs | 4.46 μs | 62.5 μs | 800 MHz |

In addition to providing coverage via cells as in LTE, NR networks also provide coverage via "beams." In general, a downlink (DL, i.e., network to UE) "beam" is a coverage area of a network-transmitted reference signal (RS) that may be measured or monitored by a UE. In NR, for example, RS can include any of the following: synchronization signal/ PBCH block (SSB), channel state information RS (CSI-RS), tertiary reference signals (or any other sync signal), posi-tioning RS (PRS), demodulation RS (DMRS), phase-track-ing reference signals (PTRS), etc. In general, SSB is avail-able to all UEs regardless of the state of their connection with the network, while other RS (e.g., CSI-RS, DM-RS, PTRS) are associated with specific UEs that have a network connection.

Figure 2:
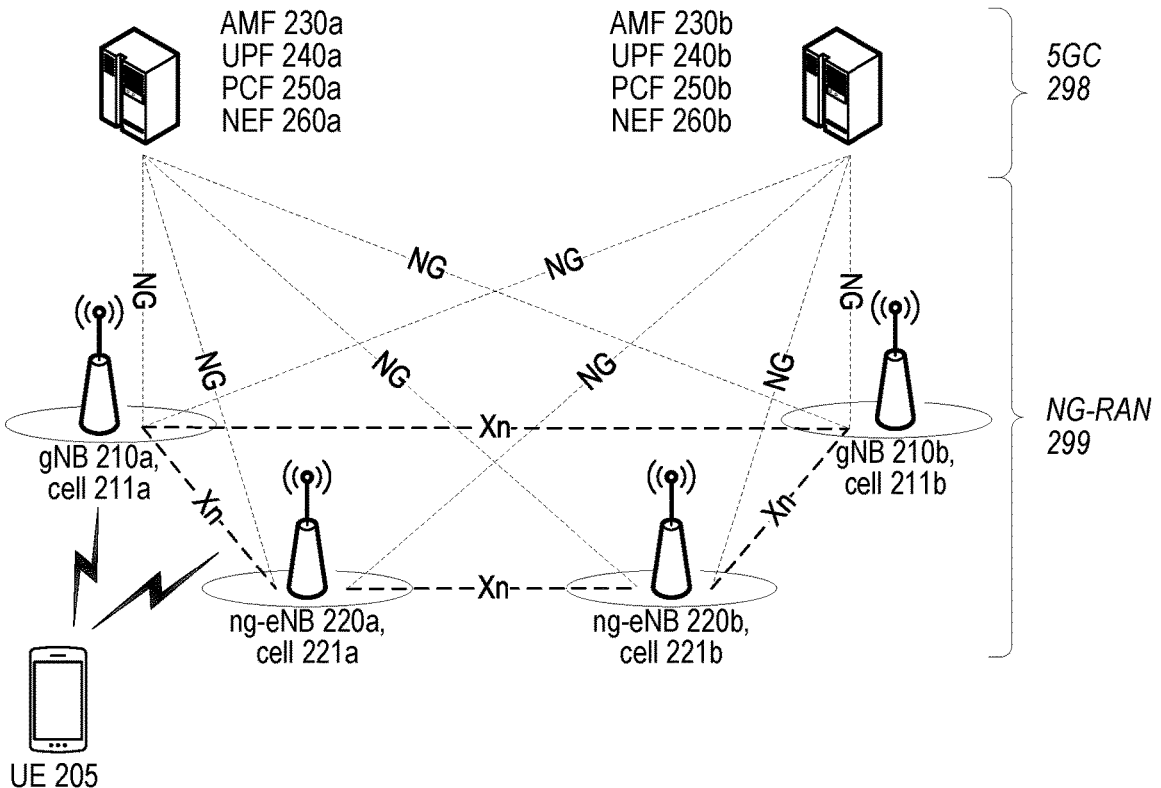
Figure 3:
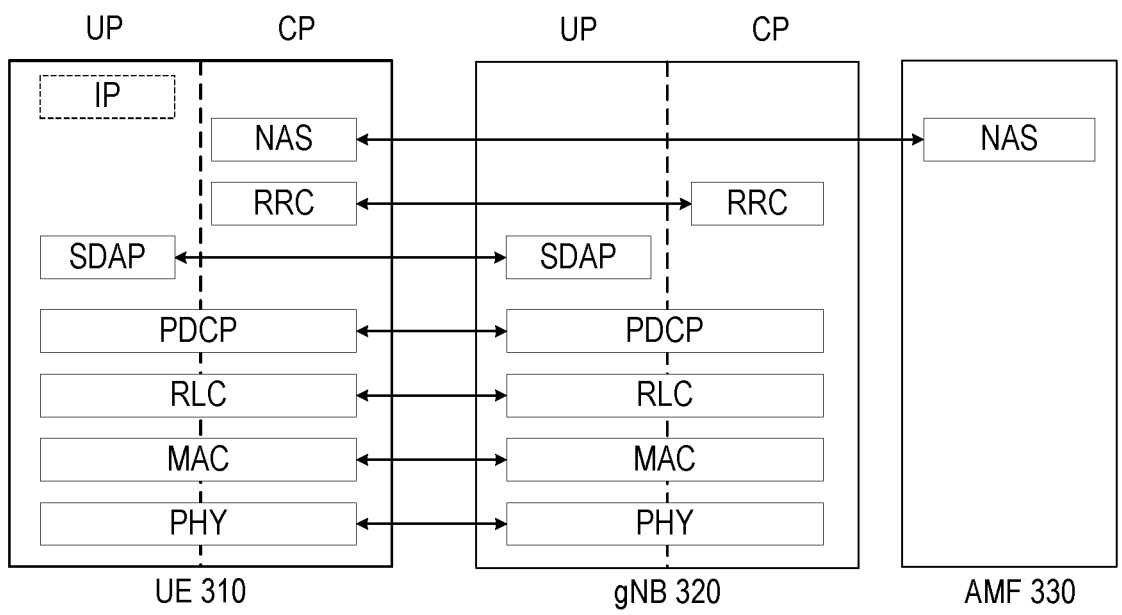
FIG. 3 shows an exemplary configuration of NR user plane (UP) and control plane (CP) protocol stacks.

FIG. 3 shows an exemplary configuration of NR user plane (UP) and control plane (CP) protocol stacks between a UE (310), a gNB (320), and an AMF (330), such as those shown in FIGS. 1-2. The Physical (PHY), Medium Access Control (MAC), Radio Link Control (RLC), and Packet Data Convergence Protocol (PDCP) layers between the UE and the gNB are common to UP and CP. The PDCP layer provides ciphering/deciphering, integrity protection, sequence numbering, reordering, and duplicate detection for both CP and UP. In addition, PDCP provides header com-pression and retransmission for UP data.

On the UP side, Internet protocol (IP) packets arrive to the PDCP layer as service data units (SDUs), and PDCP creates protocol data units (PDUs) to deliver to RLC. In addition, the Service Data Adaptation Protocol (SDAP) layer handles quality-of-service (QoS) including mapping between QoS flows and Data Radio Bearers (DRBs) and marking QoS flow identifiers (QFI) in UL and DL packets.

When each IP packet arrives, PDCP starts a discard timer. When this timer expires, PDCP discards the associated SDU and the corresponding PDU. If the PDU was delivered to RLC, PDCP also indicates the discard to RLC. The RLC layer transfers PDCP PDUs to the MAC through logical channels (LCH). RLC provides error detection/correction, concatenation, segmentation/reassembly, sequence number-ing, reordering of data transferred to/from the upper layers. If RLC receives a discard indication from associated with a PDCP PDU, it will discard the corresponding RLC SDU (or any segment thereof) if it has not been sent to lower layers.

The MAC layer provides mapping between LCHs and PHY transport channels, LCH prioritization, multiplexing into or demultiplexing from transport blocks (TBs), hybrid ARQ (HARQ) error correction, and dynamic scheduling (on gNB side). The PHY layer provides transport channel ser-vices to the MAC layer and handles transfer over the NR radio interface, e.g., via modulation, coding, antenna map-ping, and beam forming.

On CP side, the non-access stratum (NAS) layer is between UE and AMF and handles UE/gNB authentication, mobility management, and security control. The RRC layer sits below NAS in the UE but terminates in the gNB rather than the AMF. RRC controls communications between UE and gNB at the radio interface as well as the mobility of a UE between cells in the NG-RAN. RRC also broadcasts system information (SI) and performs establishment, con-figuration, maintenance, and release of DRBs and Signaling Radio Bearers (SRBs) and used by UEs. RRC also controls addition, modification, and release of carrier aggregation (CA) and dual-connectivity (DC) configurations for UEs. RRC also performs various security functions such as key management.

After a UE is powered ON it will be in the RRC_IDLE state until an RRC connection is established with the net-work, at which time the UE will transition to RRC_CON-NECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "DRX On durations"), an RRC_IDLE UE receives SI broad-cast in the cell where the UE is camping, performs mea-surements of neighbor cells to support cell reselection, and monitors a paging channel on PDCCH for pages from 5GC via gNB. An NR UE in RRC_IDLE state is not known to the gNB serving the cell where the UE is camping. However, NR RRC includes an RRC_INACTIVE state in which a UE is known (e.g., via UE context) by the serving gNB. RRC_I-NACTIVE has some properties similar to a "suspended" condition used in LTE.

5G/NR is designed to support applications demanding high rate and low latency in line with the requirements for supporting XR and cloud gaming applications. 3GPP Rel-17 includes a study item (SI) on XR Evaluations for NR. The main objectives are to identify the traffic model for each application of interest and the evaluation methodology and the key performance indicators of interest for relevant deployment scenarios, and to carry out performance evalu-ations accordingly in order to investigate possible standard-ization enhancements in potential follow-up SI or work item (WI).

Edge Computing (EC) can be a network architecture enabler for XR. In general, EC facilitates deployment of cloud computing capabilities and service environments close to the cellular radio access network (RAN). It can provide benefits such as lower latency and higher bandwidth for user-plane (UP, e.g., data) traffic, as well as reduced backhaul traffic to the 5G core network (5GC). 3GPP is also studying prospects for several new services on application architecture for enabling Edge Applications, as further described in 3GPP TR 23.758 (v17.0.0).

Figure 4:
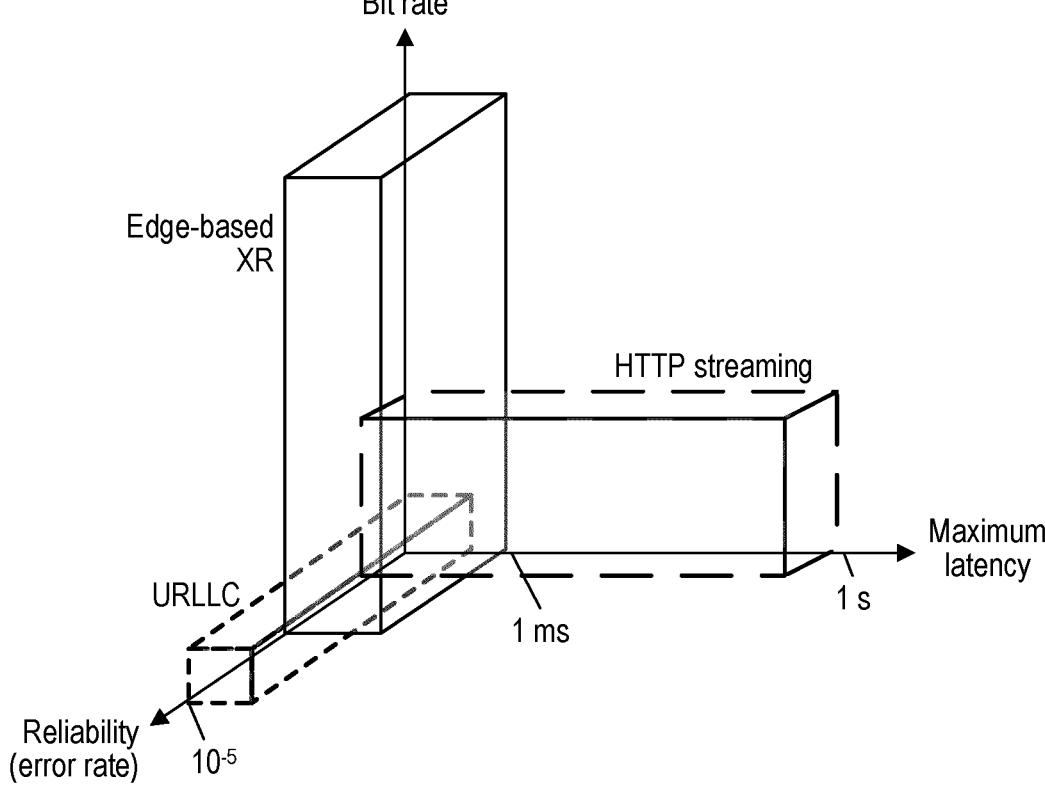
FIG. 4 illustrates a comparison of various characteristics or requirements between Extended Reality (XR) and other 5G applications.

FIG. 4 illustrates a high-level comparison of various characteristics requirements for XR and other 5G applica-tions. In particular, FIG. 4 shows a comparison of latency, reliability, and data rate requirements for URLLC, stream-ing, and EC-based XR. While URLLC services have extreme requirements of 1-ms latency and of $10^{-5}$, EC-based XR can have relaxed requirements of 5-10 ms latency and $10^{-4}$ reliability. However, XR services can require a much higher bite rate than either URLLC or streaming. (e.g., due to codec inefficiency). XR traffic can also be very dynamic, e.g., due to eye/viewport tracking.

XR requires bounded latency but not necessarily ultra-low latency. However, the end-to-end latency budget (e.g., 20-80 ms) must be distributed over several components including application processing latency, transport latency, radio link latency, etc. For these applications, short transmission time intervals (TTIs) or mini-slots may not be effective.

In general, XR traffic is relatively periodic in arrival time but average data rate requirement and dominant transmission direction (e.g., UL or DL) is dependent on the particular XR-related service. Table 2 below gives an exemplary characterization of XR services by data rate (or throughput) requirements and dominant transmission direction.

TABLE 2

| Dominant transmission direction | High data rate (large resource need) | Low data rate (small resource need) |
|---|---|---|
| DL | VR | Cloud gaming, low-end VR |
| UL | High-end AR | Low-end AR |

Figure 5:
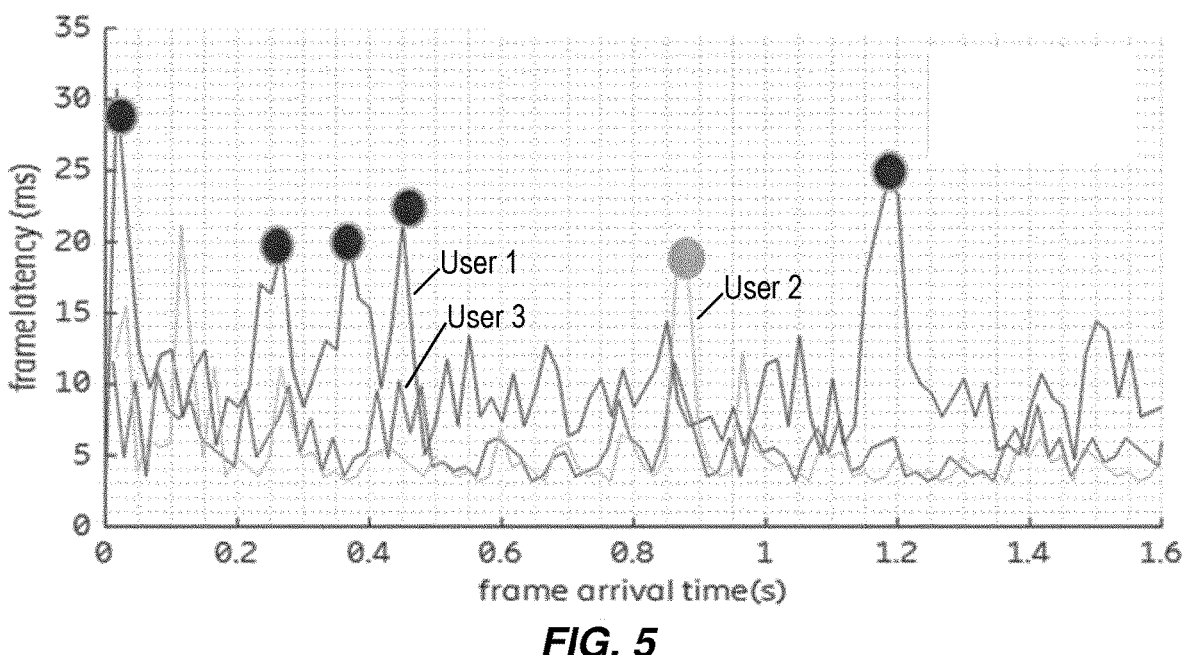
FIG. 5 shows an example of frame latency measured over a radio access network (RAN, e.g., NG-RAN).

FIG. 5 shows an example of frame latency measured over a radio access network (RAN, e.g., NG-RAN), excluding latencies of application and core network (CN, e.g., 5GC). It can be seen that the RAN latency is highly variable across three different users (i.e., 1-3) and time (i.e., 0-1.6 s), with some spikes as high as 30 ms. The sources for the latency spikes may include queuing delay, time-varying radio environments, time-varying frame sizes, etc. Techniques that can mitigate, reduce, and/or eliminate such latency spikes are beneficial to NG-RAN support for XR traffic requiring bounded and/or predictable latency.

As briefly mentioned above, XR applications typically require high data rates. This is due to both high frame refresh rates and large video frame sizes that may range from tens to hundreds of kilobytes (kB). As a concrete example, a frame size of 100 kB and a frame refresh rate of 120 Hz can lead to a data rate requirement of 95.8 Mb/s.

Figure 6:
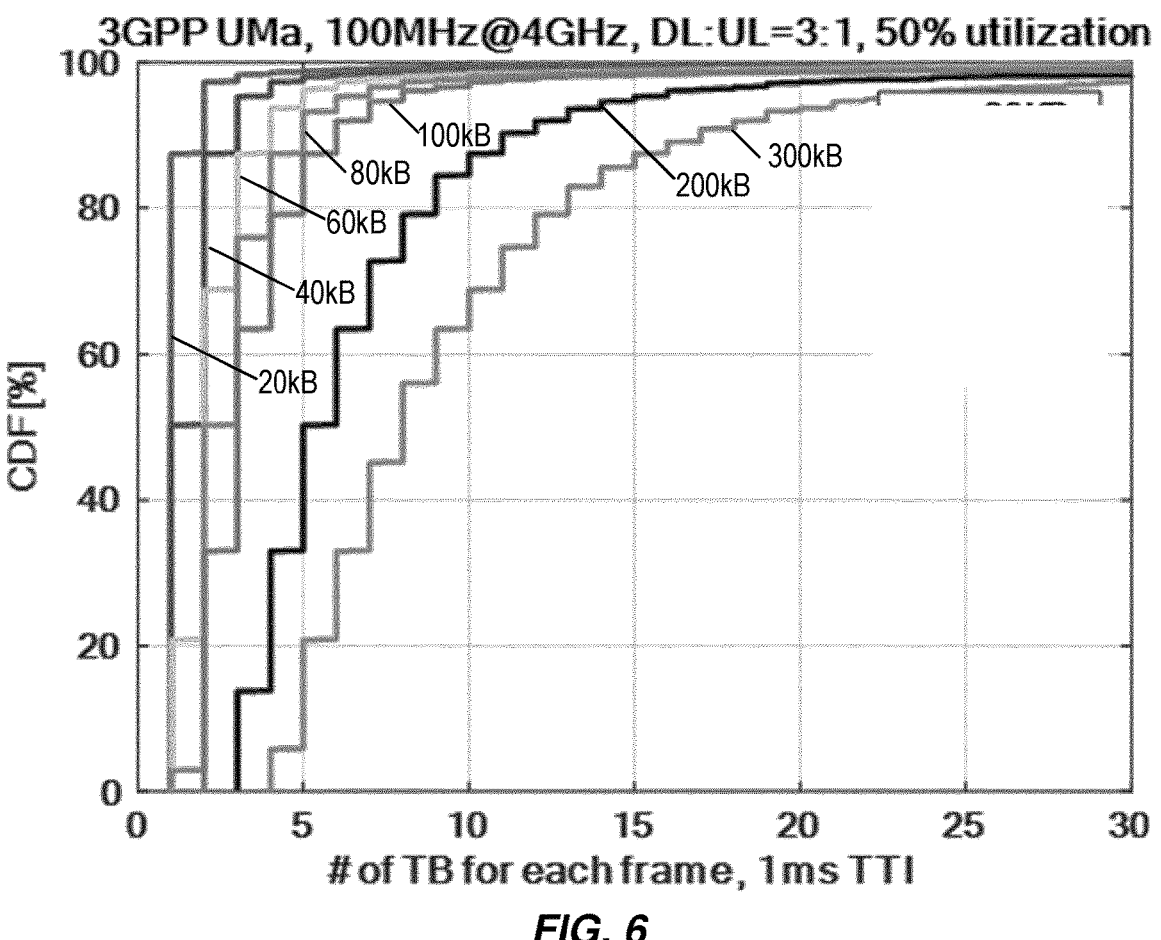
FIG. 6 shows exemplary cumulative distribution functions (CDFs) for the number of transport blocks (TBs) on the NR PHY required to deliver video frames of various sizes.

Large video frames are usually fragmented into smaller Internet Protocol (IP) packets and transmitted as several transport blocks (TBs) over several TTIs in RAN. FIG. 6 shows exemplary cumulative distribution functions (CDFs) for the number of transport blocks (TBs) on the NR PHY required to deliver a video frame of size ranging from 20 to 300 kB. For example, FIG. 6 shows that for video frames of size 200 kB, the median number of TBs is 5 but in ~5% of the cases, 15 or more TBs are required to deliver a 200-kB video frame. A 1-ms TTI and 100-MHz carrier bandwidth is assumed in FIG. 6.

Figure 7:
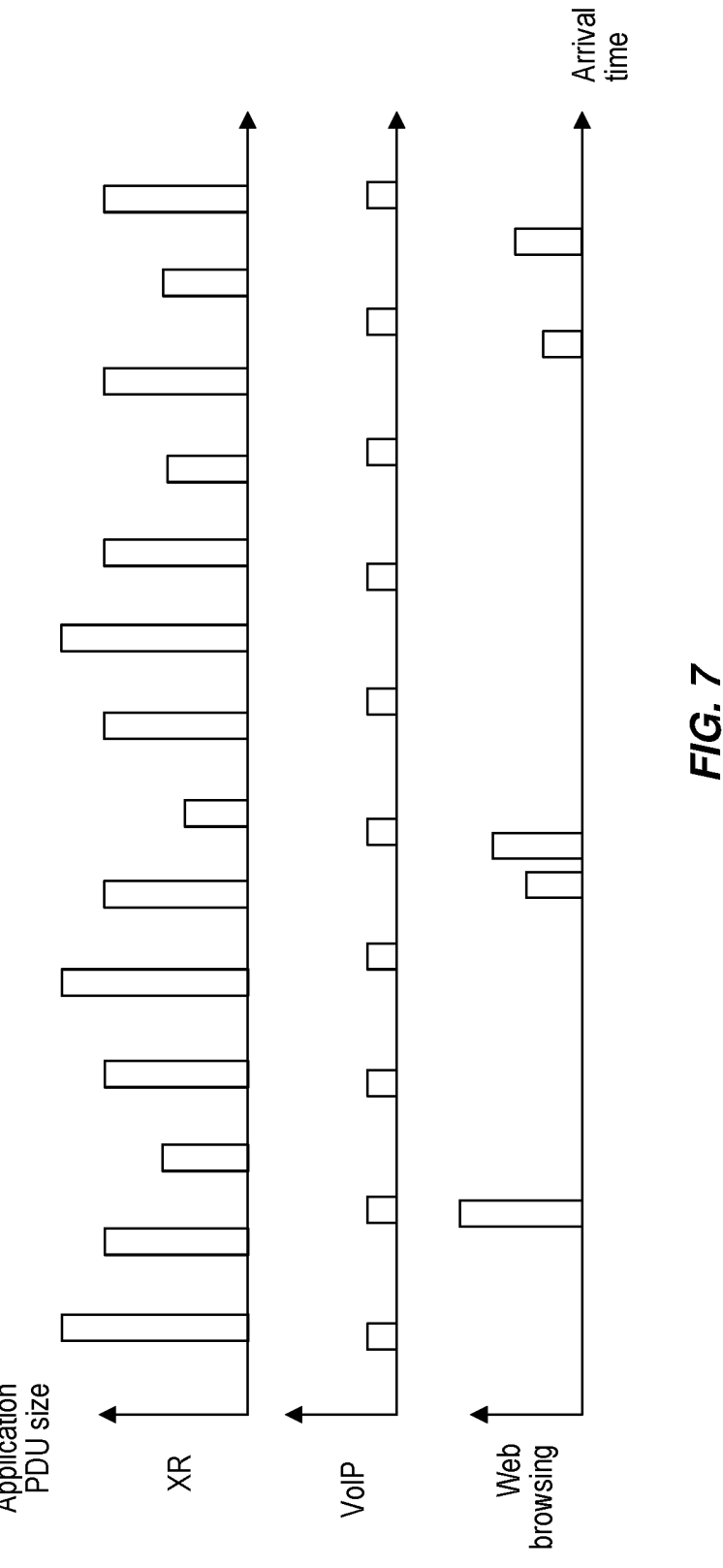
FIG. 7 shows a comparison of arrival times between XR, voice-over-IP (VoIP), and web browsing traffic.

FIG. 7 shows a comparison of arrival times between XR, voice-over-IP (VoIP), and web browsing traffic. The characteristics of XR traffic arrival time is quasi-periodic and largely predictable. This is similar to VoIP but different than web browsing, in which arrival is very unpredictable. However, the size of XR traffic (e.g., video frames) is much larger than VoTP traffic, and can vary across arrivals due to dynamics of contents and human motion. As such, XR traffic shares some characteristics with web browsing traffic.

To support UE mobility operations such as handover and cell reselection, the NG-RAN can configure a UE (e.g., via RRC) to perform periodic cell search and measurements of RS power and/or quality (e.g., RSRP, RSRQ) in RRC_CONNECTED, RRC_IDLE, and RRC_INACTIVE states. Such measurements are often called radio resource management (RRM) measurements.

The UE is responsible for detecting new neighbor cells and for tracking and monitoring already detected cells. The detected cells and the associated measurement values are reported to the network. A non-connected UE in RRC_IDLE or RRC_INACTIVE state performs RRM measurements only SSB. A UE in RRC_CONNECTED state can perform RRM measurements on additional DL RS including CSI-RS, PRS, DMRS, PTRS, etc.

An NR UE can perform handover between NR cells, as well as from (to) an NR source cell to (from) a target cell that uses another RAT, such as LTE (EUTRA) or UMTS (UTRA). This is referred to as an "inter-RAT handover". NG-RAN can configure a UE (e.g., via RRC) to perform measurements on various carrier frequencies and various RATs corresponding to neighbor cells. The configuration for each of these measurements is referred to as a "measurement object." Furthermore, the UE can be configured to perform the measurements according to a "measurement gap pattern" (or "gap pattern" for short), which can include a measurement gap repetition period (MGRP, i.e., how often a recurring gap is available for measurements) and a measurement gap length (MGL, i.e., the length of each recurring gap). The configuration can also include types of measurements (e.g., RSRP, RSRQ, SINR, RSSI, etc.) and higher-layer measurement filtering coefficients.

The measurement configuration can also include a reporting configuration, including reporting frequency (for periodic reporting, e.g., every 640 ms) or time-to-trigger and triggering events (for event-based reporting). Example measurement report triggering events include:

Event A1: Serving cell measurement becomes better than threshold.

Event A2: Serving cell measurement becomes worse than threshold.

Event A3: Neighbour cell measurement becomes offset better than special cell (SpCell).

Event A4: Neighbour cell measurement becomes better than threshold.

Event A5: SpCell measurement becomes worse than threshold1 and neighbour cell measurement becomes better than threshold2.

Event A6: Neighbour cell measurement becomes offset better than SCell.

Note that the SpCell can be the UE's primary cell (PCell) or the UE's primary secondary cell (PSCell), in cases where the UE is in dual connectivity towards a master node (MN) and a secondary node (SN).

A radio link failure (RLF) procedure is typically triggered in the UE when something unexpected happens in any of the mobility-related procedures, including handover. The RLF procedure involves interactions between RRC and lower layer protocols such as PHY (or L1), MAC, RLC, etc. including radio link monitoring (RLM) on L1.

Upon handover failure (HOF) and RLF, the UE may take autonomous actions such as trying to select a cell and initiate reestablishment so the UE can remain reachable by the network. In general, a UE declares RLF only when the UE realizes that there is no reliable communication channel (or radio link) available between itself and the network, which can result in poor user experience. Also, reestablishing the connection requires signaling with a newly selected cell (e.g., random access procedure, exchanging various RRC messages, etc.), introducing latency until the UE can again reliably transmit and/or receive user data with the network.

The principle of RLM is similar in LTE and NR. In general, the UE monitors link quality of the UE's serving cell and uses that information to decide whether the UE is in-sync (IS) or out-of-sync (OOS) with respect to that serving cell. In LTE, RLM is carried out by the UE measuring downlink reference signals (e.g., CRS) in RRC_CONNECTED state. If RLM (i.e., by L1/PHY) indicates number of consecutive OOS conditions to the UE RRC layer, then RRC starts a radio link failure (RLF) procedure and declares RLF after expiry of a timer (e.g., T310). The L1 RLM procedure is carried out by comparing the estimated CRS measurements to some target block error rates (BLERs), called Qout and Qin. In particular, Qout and Qin correspond to BLER of hypothetical PDCCH/PCIFCH transmissions from the serving cell, with exemplary values of 10% and 2%, respectively. In NR, the network can define the RS type (e.g., CSI-RS and/or SSB), exact resources to be monitored, and even the BLER target for IS and OOS indications.

FIG. 8 shows a high-level timing diagram illustrating the two phases of a RLF procedure in LTE and NR. The first phase starts upon radio problem detection and leads to radio link failure detection after no recovery is made during a period T1. The second phase starts upon RLF detection or handover failure and ends with the UE returning to RRC_IDLE if no recovery is made during a period T2.

FIG. 9 shows a more detailed version of the UE's operations during an exemplary LTE RLF procedure. In this example, the UE detects N310 consecutive OOS conditions during L1 RLM procedures, as discussed above, and then initiates timer T310. Subsequent operations are performed by higher layers (e.g., RRC). After expiry of T310, the UE starts T311 and RRC reestablishment, searching for the best target cell. After selecting a target cell for reestablishment, the UE obtains SI for the target cell and performs a random access (e.g., via RACH). The duration after T310 expiry until this point can be considered the UE's reestablishment delay. Ultimately, the UE obtains access to the target cell and sends an RRC Reestablishment Request message to the target cell. The duration after T310 expiry until this point can be considered the total RRC reestablishment delay.

The actual XR service being used by a particular UE—and corresponding data rate requirements—may dynamically vary over time depending on a user's interest. The network's ability to meet these varying data rate requirements also depends on the number of active users of each XR service type sharing the radio resources of a cell. Thus, a particular user may experience varying quality-of-service (QoS) and/or quality-of-experience (QoE) due to changes in numbers and/or data rate requirements of other users, even if the particular user remains close to the serving network node (e.g., gNB) and has relatively fixed data rate requirements. Changes in the particular user's actual data rate requirements (e.g., according to XR service type) may further exacerbate these variations.

When a UE experiences these degradations, it may be desirable to handover the UE to a neighbor cell that can better meet the UE's data rate requirements. Even so, existing mobility procedures such as handover rely on a UE's event-triggered reports, which are typically sent when the UE is near a border of its serving cell. As noted above, however, a UE may experience degradations in QoS and/or QoE for XR services for other reasons than being near a cell border.

Accordingly, embodiments of the present disclosure provide flexible and efficient techniques whereby a UE can trigger measurement reporting based on one or more parameters (e.g., signal thresholds) that depend on the type of traffic or service(s) that UE is currently providing (e.g., to the end-user) or consuming (e.g., from the network). A network node that provides the UE's serving cell (e.g., a serving or source node) can configure the UE with at least two sets of measurement reporting configurations (including, e.g., measurement triggering and/or reporting parameters) associated with respective types of traffic, e.g., a first set (S1) associated with a first traffic type (R1) and a second set (S2) associated with a second traffic type (R2). The UE selects one of the measurement reporting configurations based on the UE's current traffic type (e.g., for services currently being used by the end user) and performs measurements and/or measurement reporting according to the selected reporting configuration. Reported measurement results are used by the network node to determine when to perform handover (or another relevant mobility operation) of the UE to a neighbor (or target) cell, which can be done before the UE's QoS and/or QoE in the serving cell becomes unacceptable (e.g., due to inadequate data rate).

In some embodiments, the association and/or mapping or relation between measurement configuration (e.g., S1/S2) and traffic type (e.g., R1/R2) can be based on a rule that is pre-defined or configured by the network node. Examples of traffic types having different measurement reporting configurations include XR and eMBB, XR and URLLC, XR type 1 (e.g., VR) and XR type 2 (e.g., low-end VR or low-end AR), etc. The association, mapping, and/or rule can be represented in various forms including table, mathematical or logical function/equation/expression, etc.

In general, at least one parameter differs between the sets of measurement reporting configurations. Some exemplary parameters that can differ between sets include signal thresholds for triggering an event (e.g., RSRP threshold in event A2), reporting periodicity, SCell measurement cycle (when UE configured with CA/DC), measurement sampling rate, etc. As a more specific example, triggering event A2 can be configured such that the UE uses a higher signal threshold (e.g., −90 dBm) for measurement reporting when using XR-type services and a lower signal threshold (e.g., −100 dBm) for measurement reporting when using eMBB service. As such, the network can receive and act upon these measurements to perform a cell change for the UE well before UE's QoS and/or QoE in the serving cell becomes unacceptable (e.g., due to inadequate data rate).

Such embodiments can provide various benefits and/or advantages. For example, these techniques facilitate XR service continuity for users even when aggregate traffic load increases in a serving cell. Also, these techniques can enhance mobility performance of XR service users since a UE's serving cell can be changed before XR QoS/QoE becomes unacceptable. Furthermore, a network can rely on existing handover procedures even for XR service users by introducing new reporting triggers, which reduces and/or minimizes the impact of XR services on existing network mobility procedures.

The terms "measurement reporting configuration", "measurement configuration", and "reporting configuration" are used interchangeably have the same meaning herein, unless a different meaning is expressly stated or can be unambiguously inferred from the context of use. In general, a measurement configuration includes, identifies, specifies, and/or defines one or more parameters that trigger, enable, and/or facilitate the UE to perform or report one or more measurements of signal(s) transmitted by the network. A triggered measurement may be used by the UE for autonomous actions (e.g., cell reselection in RRC_IDLE) or reported by the UE to the network (e.g., as a measurement value). The measurement configuration may identify particular measurements to be performed, triggering events that initiate performing or reporting measurements, etc.

In one specific example, the information element (IE) ReportConfigNR defined in 3GPP TS 38.331 (v16.3.1) specifies criteria for triggering of an NR measurement reporting event or parameters for periodic reporting (e.g., reporting interval or periodicity, etc.). The measurement reporting events are based on measurement results, which can either be derived based one or more reference signals such as SSB, CSI-RS, etc. Specific examples of parameters for triggering events include hysteresis, time to trigger (TTT), threshold value for the triggering parameter (e.g., RSRP, RSRQ, SINR), which can be specific to either SSB or CSI-RS.

In some embodiments, a measurement configuration can identify one or more cells (e.g., by identifier such as PCI or CGI) that should not be measured by the UE. For example, the measurement configuration can identify one or more cells that do not support XR services. In some embodiments, a measurement configuration can identify one or more cells (e.g., by identifier such as PCI or CGI) that should be measured by the UE. For example, the measurement configuration can identify one or more cells that do support XR services. In some embodiments, a measurement configuration can also identify the specific types of traffic types (e.g., XR, eMBB, etc.) supported by the identified cells. The UE can use any of this information in the measurement configuration to determine which cells should or should not be measured, e.g., according to a measurement configuration associated with an XR traffic type. For example, if the UE is currently carrying XR traffic, it can determine not to measure cells that do not support XR when using a measurement configuration associated with the XR traffic type.

As briefly mentioned above and described further below, in some embodiments, the UE determines the association or mapping between traffic type and measurement configuration based on a rule that is pre-defined or configured by the network node. Furthermore, the UE can determine a particular traffic type based on various criteria and/or parameters, discussed in more detail below. In other embodiments, however, the network can determine a traffic type used by the UE based on known QoS information from higher layers and indicate to the UE a measurement configuration applicable to the determined traffic type. These embodiments can be beneficial for DL-heavy XR services, in which the network has access to more information from which to determine traffic type (explicitly or by inference).

In various embodiments, measurement configurations associated with respective traffic types can differ in various ways. For example, the UE can be configured with a measurement configuration that includes two or more different values for a particular configuration parameter (e.g., triggering threshold). Each parameter value is associated with a particular traffic type (e.g., VR, eMBB) or group of traffic types (e.g., XR and eMBB). Other parameters in the measurement reporting configuration message can be the same for each traffic type. This example can be extended to apply to subset of the parameters of the measurement configuration.

As another example, the UE can be configured with multiple measurement configurations (e.g., via one or more RRC messages), where each measurement configuration is complete but differs from the other measurement configuration(s) in the values of one or more configuration parameters (e.g., triggering threshold). Each different value of the configuration parameter(s) is associated with a particular traffic type (e.g., VR, eMBB) or group of traffic types (e.g., XR and eMBB). The other parameters can have the same values across the multiple measurement configurations.

As another example (which can be viewed as a combination of the above two), the UE can be configured with two measurement reporting configurations via two messages. A first message (M1) contains only parameters that are specific to traffic type, i.e., different values for the same parameter (e.g., triggering threshold). In M1, each parameter value is associated with a particular traffic type (e.g., VR, eMBB) or group of traffic types (e.g., XR and eMBB). A second message (M2) contains values for parameters that are the same for the two measurement configurations, i.e., regardless of traffic type used by the UE. Examples of such parameters are layer-3 filtering coefficient, time to trigger, etc.

In various embodiments, a UE may obtain the association or relation between the measurement configurations and traffic types based on a rule, which can be pre-defined or configured by the network, e.g., in the UE's serving cell.

In various embodiments, a "traffic type" can be distinguished by particular values of one or more UE traffic parameters, such that the UE can determine a measurement configuration to apply based on current values of these traffic parameters. The traffic parameters can be the same or different for DL and UL traffic. Different examples are discussed below.

As one example, traffic type can be identified by data rate of signals transmitted by the UE and/or received by the UE over a particular time period, Tb. The data rate can be determined by the UE using a suitable function over Tb. The data rate can be defined as the bit rate at PHY, MAC, RLC, or PDCP layer. The data rate can be also defined as the total data rate for all data incoming/outgoing at the UE, or can be defined per service, traffic type, bearer, or LCH; per any group of services, traffic types, bearers, or LCHs (e.g., LCG); or any combination thereof. Example functions that can be used to determine the bit rate parameter include average, maximum, minimum, x-th percentile, etc. Different values of the data rate parameter can be associated with different types of service, e.g., data rate R1 and R2 correspond to eMBB and XR services respectively. The data rate may further be within certain range, e.g., $R1\_min \leq R1 \leq R1\_max$ and $R2\_min \leq R2 \leq R2\_max$, where R1 and R2 are different (e.g., $R1 < R2$).

As another example, traffic type can be identified by certain traffic patterns, which can be configured by the network node or pre-defined. Different traffic patterns and their identifiers may be associated with different type of services, e.g., pattern 1 to eMBB and pattern 2 to XR. An example traffic pattern is a certain number of messages (K1), or packets of certain size (Ms) being transmitted during a time period (Tm). As a more specific example, the UE may estimate its DL bitrate based on PDSCH reception over certain time period and/or its UL bitrate based on PUSCH transmission over certain time period. As special case, K1=1. The message size may further be within certain range, e.g., $Ms\_min \leq Ms \leq Ms\_max$. Traffic pattern can also be identified based on radio resource utilization (U), e.g., estimated by the number of resource blocks (e.g., PRBs) used by the UE divided by the total number of resource blocks available on a carrier, bandwidth part (BWP), etc. during Tm. For example, an XR UE may use a large number of resources leaving fewer resources for other UEs (e.g., eMBB UEs), such that mobility procedures (e.g., cell reselection, handover, SCell addition, etc.) can be initiated for these users based on resource utilization (U). Parameters used to determine a resource utilization metric (U) (e.g., K1, Ms, Tm, Ms_min, Ms_max, etc.) can be pre-defined or configured by the network node.

As another example, traffic type can be identified by target quality of service (QoS), e.g., with respect to any one or more lower- or higher-layer parameters. Examples of lower-layer parameters PHY block error rate (BLER) or frame error rate (FER), latency and/or jitter of successful reception of PHY or MAC PDUs, etc. Examples of higher-layer parameters include RLC or PDCP packet loss rate, transport data block error rate, application level packet/message error rate, and/or latencies associated with any of these data units (e.g., packet transmission delay). The UE estimate the QoS based on any of these parameters, with the estimated QoS being mapped to different service types. For example, a first PDCP packet error rate (Rp1) can correspond to eMBB service and a second PDCP packet error rate (Rp2) can correspond to XR service, where Rp1 and Rp2 are different (e.g., Rp2<Rp1).

As another example, the UE can be explicitly configured by the network with an explicit identifier of traffic type being handled by the UE. The mapping between the identifiers and traffic types can be pre-defined, e.g., IDs 0-1 correspond to eMBB and XR traffic types, IDs 0-2 correspond to eMBB, VR, and AR traffic types, etc. The UE can be configured with the explicit identifier by signaling from higher layers (e.g., RRC message) and/or from lower layers (e.g., MAC CE, DCI, etc.).

As another example, traffic type can be identified by DRB or Logical Channel ID (LCID), with different DRBs or LCIDs being associated with different measurement configurations. As a more specific example, a first measurement configuration can correspond to DRB3 and/or LCID5, while a second measurement configuration can correspond to DRB2 and/or LCID4. In this example, the respective DRBs carry traffic for different types of services, e.g., DRB3 for XR and DRB2 for eMBB.

In some cases, however, a single DRB may carry multiple types of traffic or services. In such case, traffic type can be identified by QoS Flow Identity (QFI) to further differentiate between service-specific traffic carried by a single DRB.

Any of the above examples can be combined. As an exemplary combination, the UE can identify the traffic type by the bit rate carried by a particular DRB, LCID, or QFI over the time period Tb. After determining the traffic type being used by the UE, the UE determines the corresponding measurement configuration and use it for triggering measurements and/or periodic or event-triggered reports.

The following description provides 10 examples that illustrate various features of the embodiments described above. In other words, these examples are merely illustrative and should not be construed as limiting scope of the techniques and/or embodiments of the present disclosure.

A first example is illustrated by Table 3 below. This can be considered a relatively generic case in which the UE is configured with N measurement reporting configuration sets ($S_1, \ldots, S_N$), associated with respective N different traffic types (R1, ..., RN). Each type can be assigned an ID, which are shown as 0 ... N−1 for simplicity in Table 3.

TABLE 3

| Traffic type ID | Traffic Type (R) | Measurement reporting configuration set (S) |
|---|---|---|
| 0 | R1 | S1 |
| 1 | R2 | S2 |
| . . . | . . . | . . . |
| N-1 | $R_N$ | $S_N$ |

In a second example, a group of two or more traffic types may be associated with the same measurement reporting configuration set, and there can be two or more groups (e.g., G1 and G2). This example is shown in Table 4, where a group of K different traffic types are associated with a first reporting configuration (S1) and the remaining group of (N-K) different traffic types are associated with a second reporting configuration (S2).

TABLE 4

| Traffic type ID | Traffic Type (R) and Group (G) | Measurement reporting configuration set (S) |
|---|---|---|
| 0 | R1/G1 | S1 |
| 1 | R2/G1 | |
| . . . | . . . | |
| K-1 | Rk/G1 | |
| K | $R_{K+1}$/G2 | S2 |
| . . . | . . . | |
| N-2 | $R_{N-1}$/G2 | |
| N-1 | $R_N$/G2 | |

In a third example shown in Table 5 below, there are two types of traffic, eMBB and XR, with each traffic type associated with a particular reporting configuration—eMBB with S1 and XR with S2. In this example, XR traffic represents any traffic associated with any XR-type service, including VR, AR, etc. As such, "XR" in this example may also be seen as an implicit group of XR traffic types.

TABLE 5

| Traffic type ID | Traffic Type | Measurement reporting configuration set (S) |
|---|---|---|
| 0 | XR | S1 |
| 1 | eMBB | S2 |

In a fourth example shown in Table 6 below, there are two types of XR-related traffic, VR and AR, with each traffic type associated with a particular reporting configuration—VR with S1 and AR with S2.

TABLE 6

| Traffic type ID | Traffic Type | Measurement reporting configuration set (S) |
|---|---|---|
| 0 | VR | S1 |
| 1 | AR | S2 |

In a fifth example shown in Table 7 below, there are multiple types of XR traffic together with eMBB traffic. Each traffic type is associated with particular reporting configuration, eMBB with S1 and XR traffic types of low end VR, high end VR, low end AR and high end AR with S2-S5, respectively,

TABLE 7

| Traffic type ID | Traffic Type | Measurement reporting configuration set (S) |
|---|---|---|
| 0 | eMBB | S1 |
| 1 | Low-end VR | S2 |
| 2 | High -end VR | S3 |
| 3 | Low-end AR | S4 |
| 4 | High-end AR | S5 |

The sixth example shown in Table 8 below illustrates eMBB and XR traffic types that are associated with different values of event triggering threshold parameter for event E1. The seventh example shown in Table 9 below illustrates eMBB and XR traffic types that are associated with different values of event triggering threshold parameter for event E1. In these examples, XR traffic represents any traffic associated with any XR-type service, including VR, AR, etc. The thresholds for E1 (X11 and X12) and E2 (X21 and X22) can be expressed in dBm in case the triggering measurement quantity is signal strength (e.g., RSRP). In another example, the thresholds for E1 and E2 can be expressed in dB in case the triggering measurement quantity is signal quality (e.g., RSRQ, SINR, etc.).

TABLE 8

| Traffic type ID | Traffic Type | Event-triggered threshold for event E1 |
|---|---|---|
| 0 | eMBB | X11 |
| 1 | XR | X12 |

TABLE 9

| Traffic type ID | Traffic Type | Event-triggered threshold for event E2 |
|---|---|---|
| 0 | eMBB | X21 |
| 1 | XR | X22 |

The following description further illustrates operation of embodiments according to these examples. The UE is configured with event E1 that is triggered when signal level (e.g., RSRP) falls below a certain signal threshold. In such case, the UE determines the appropriate threshold and triggers E1 according to the following rules and/or criteria:

If the end user is using eMBB service (i.e., via the UE), then the UE selects X11 and triggers event E1 when the RSRP measurement in the serving cell is below X11 dBm.

If the end user is using XR service (i.e., via the UE), then the UE selects X12 and triggers event E1 when the RSRP measurement in the serving cell is below X12 dBm.

If the end user is using both XR and eMBB services during some previous time period, the UE may also use X12 for triggering event E1.

In general, X11 and X12 are different values but as an example X12>X11. As a specific example, X12=−90 dBm and X11=−100 dBm.

Alternately or additionally, the UE is configured with event E2 that is triggered when signal level (e.g., RSRP) exceeds a certain signal threshold. In such case, the UE determines the appropriate threshold and triggers E2 according to the following rules and/or criteria:

If the end user is using eMBB service (i.e., via the UE), then the UE selects X21 and triggers event E2 when the RSRP measurement in the serving cell is above X21 dBm.

If the end user is using XR service (i.e., via the UE), then the UE selects X22 and triggers event E2 when the RSRP measurement in the serving cell is above X22 dBm.

If the end user is using both XR and eMBB services during some previous time period, the UE may also use X22 for triggering event E2.

In general, X21 and X22 are different values but as an example X22>X21. As a specific example, X22=−95 dBm and X21=−105 dBm.

In an eighth example shown in Table 10 below, the UE is configured to report measurements for one or more cells (e.g., serving cell) periodically. The UE is further configured with at least two traffic types (e.g., eMBB and XR, XR types 1 and 2, or any combination thereof) that are associated with respective reporting periodicities. For example, the UE is configured to report a signal level measurement (e.g., RSRP)

with a first periodicity (T1) for eMBB traffic type and with a second periodicity (T2) for XR traffic type. If both eMBB and XR traffic types are present/active, then the UE may be configured to report the measurement with T2.

TABLE 10

| Traffic type ID | Traffic Type | Measurement reporting periodicity |
|---|---|---|
| 0 | eMBB | T1 |
| 1 | XR | T2 |

In general, T1 and T2 are different values but as an example T1>T2, such that the UE reports the measurement more frequently when XR traffic is present/active. This enables the network to monitor the signal level of the serving cell more actively for XR traffic as compared to eMBB traffic, such that the network can more quickly detect any problems and perform any necessary remedial action (e.g., cell change, measurement reconfiguration, increase transmit power, etc.) towards the UE.

In a ninth example shown in Table 11 below, there are two types of XR traffic, VR and AR, that are associated with different DRBs and with respective reporting configurations, e.g., VR with S1 and AR with S2. Based on these associations, the UE can determine a reporting configuration to use based on which DRB is carrying data traffic.

TABLE 11

| DRB ID | Traffic Type | Measurement reporting configuration set (S) |
|---|---|---|
| 1 | VR | S1 |
| 2 | AR | S2 |

In a tenth example shown in Table 12 below, there are two types of XR traffic, VR and AR, that are associated with different QFIs and with respective reporting configurations, e.g., VR with S1 and AR with S2. Based on these associations, the UE can determine a reporting configuration to use based on which QFI is carrying data traffic.

TABLE 12

| QFI | Traffic Type | Measurement reporting configuration set (S) |
|---|---|---|
| 1 | VR | S1 |
| 2 | AR | S2 |

Figure 10:
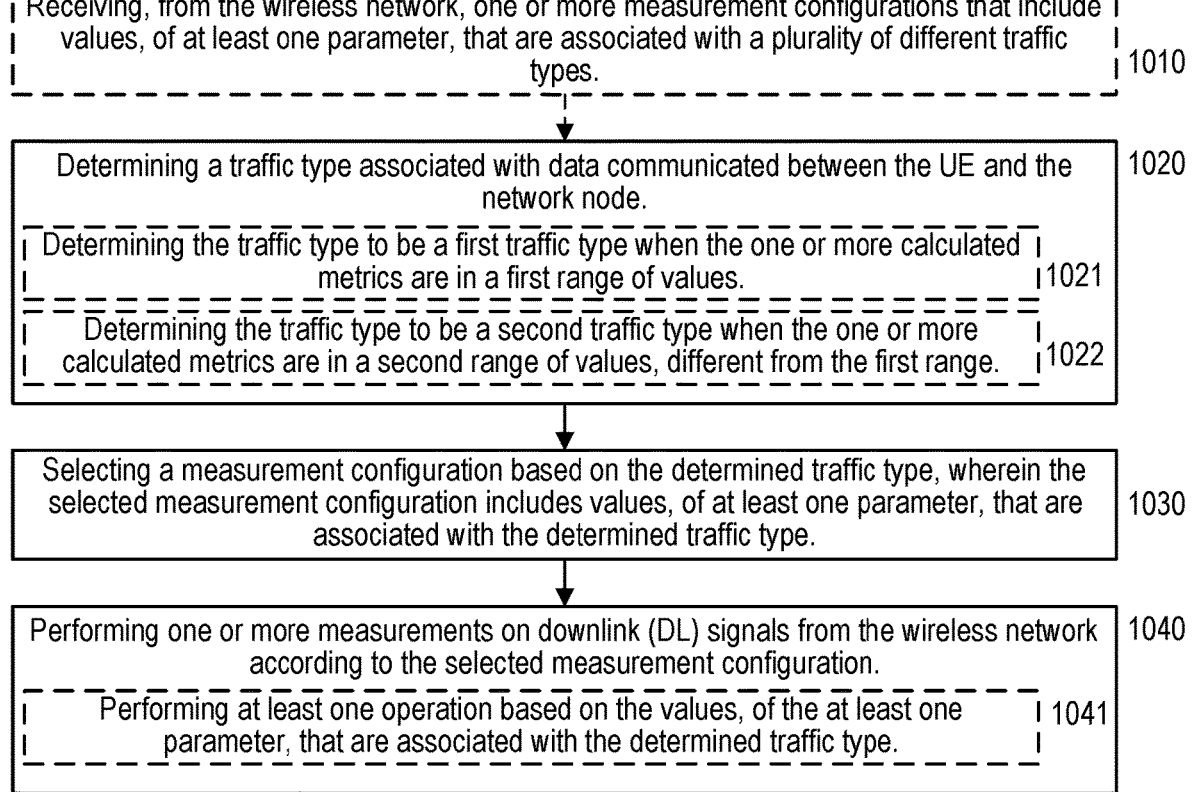
FIG. 10 shows a flow diagram of an exemplary method for a UE (e.g., wireless device), according to various embodiments of the present disclosure.

Various features of the embodiments described above correspond to various operations illustrated in FIGS. 10-11, which show exemplary methods (e.g., procedures) for a UE and a network node, respectively. In other words, various features of the operations described below correspond to various embodiments described above. Furthermore, the exemplary methods shown in FIGS. 10-11 can be used cooperatively to provide various benefits, advantages, and/or solutions to problems described herein. Although FIGS. 10-11 show specific blocks in particular orders, the operations of the exemplary methods can be performed in different orders than shown and can be combined and/or divided into blocks having different functionality than shown. Optional blocks or operations are indicated by dashed lines.

In particular, FIG. 10 shows an exemplary method (e.g., procedure) for a UE configured to communicate data corresponding to multiple traffic types with a network node of a wireless network, according to various embodiments of the present disclosure. The exemplary method can be performed by a UE (e.g., wireless device, IoT device, etc.) such as described elsewhere herein.

The exemplary method can include the operations of block 1020, where the UE can determine a traffic type associated with data communicated between the UE and the network node. The communicated data can be UL data, DL data, or a combination thereof. Furthermore, the traffic type can be determined based on data currently being communicated (e.g., an ongoing data session), data previously communicated (e.g., a previous data session), data expected to be communicated (e.g., a planned data session), or a combination thereof.

The exemplary method can also include the operations of block 1030, where the UE can select a measurement configuration based on the determined traffic type. Specifically, the selected measurement configuration includes values, of at least one parameter, that are associated with the determined traffic type. The exemplary method can also include the operations of block 1040, where the UE can perform one or more measurements (e.g., RRM measurements) on DL signals from the wireless network according to the selected measurement configuration.

In some embodiments, performing the one or more measurements in block 1040 can include the operations of sub-block 1041, where the UE can perform at least one operation based on the value (or values, i.e., of the at least one parameter) associated with the determined traffic type. In various embodiments, the at least one operation performed in sub-block 1041 based on the value associated with the determined traffic type can include any of the following:

initiating a measurement based on an event corresponding to the values, of the at least one parameter, that are associated with the determined traffic type;

reporting a measurement to the wireless network based on an event corresponding to the values, of the at least one parameter, that are associated with the determined traffic type; and periodically reporting a measurement to the wireless network based on a periodicity corresponding to the values, of the at least one parameter, that are associated with the determined traffic type.

In some embodiments, the exemplary method can also include the operations of block 1010, where the UE can receive, from the wireless network, one or more measurement configurations that include values, of the at least one parameter, that are associated with a plurality of different traffic types. In such case, the measurement configuration is selected in block 1020 from the one or more measurement configurations received in block 1010.

In some of these embodiments, the one or more measurement configurations can include a single measurement configuration including a plurality of different values, of the at least one parameter, that are associated with a respective plurality of traffic types. In other words, the measurement configuration can provide values of the at least one parameter for each of the plurality of traffic types, such as in the examples discussed above.

In other of these embodiments, the one or more measurement configurations can include a plurality of measurement configurations having a respective plurality of different values, of the at least one parameter, that are associated with a respective plurality of traffic types. In other words, the different measurement configurations have traffic-type-specific values of the at least one parameter, such as in other examples discussed above.

In some embodiments, the plurality of traffic types include enhanced mobile broadband (eMBB) service and extended reality (XR) service. Each parameter, of the at least one parameter, includes respective values that are associated with the eMBB service and the XR service.

In other embodiments, the plurality of traffic types include a plurality of different extended XR services (e.g., VR, AR, etc.). Each parameter, of the at least one parameter, includes respective values that are associated with the respective plurality of different XR services. In some variants, the multiple traffic types can also include eMBB service, such that each parameter, of the at least one parameter, includes a further value that is associated with the eMBB service.

In some embodiments, determining the traffic type (e.g., in block 1020) can be based on one or more metrics calculated by the UE based on the data and/or on one or more explicit identifiers associated with the data. In some of these embodiments, the determining operations in block 1020 can include the operations of sub-blocks 1021-1022. In sub-block 1021, the UE can determine the traffic type to be a first traffic type (e.g., eMBB) when the one or more calculated metrics are in a first range of values. In sub-block 1022, the UE can determine the traffic type to be a second traffic type (e.g., XR) when the one or more calculated metrics are in a second range of values, the second range being different than (e.g., partially- or non-overlapping with) the first range. Some exemplary ranges were discussed above.

In some of these embodiments, the calculated metrics can include any of the following: data rate metrics, traffic pattern metrics, and quality-of-service (QoS) metrics. In some embodiments, the traffic pattern metrics can include one or more statistics for any of the following over a previous duration:

number of data packets communicated;

inter-arrival time of data packets communicated;

size of data packets communicated; and radio resource utilization.

In some embodiments, the data rate metrics can include one or more data rate statistics for any of the following over a previous duration: the UE; a service provided by the UE; one or more data radio bearers (DRB); and one or more logical channels (LCH).

In some embodiments, the QoS metrics can include one or more statistics for any of the following over a previous duration: physical-layer (PHY) block error rate (BLER), transport BLER, frame error rate (FER), packet loss rate, and timing of successfully received protocol data units (PDUs) or packets.

In some embodiments, the explicit identifiers associated with the data include any of the following: the traffic type; one or more data radio bearers (DRB); one or more logical channels (LCH); and one or more QoS flows (QFI). Any of these can be used by the UE for determining the traffic type in block 1020.

In addition, FIG. 11 shows an exemplary method (e.g., procedure) for a network node configured to communicate data corresponding to multiple traffic types with a UE in a wireless network, according to various embodiments of the present disclosure. The exemplary method can be performed by a network node (e.g., base station, eNB, gNB, ng-eNB, etc., or component thereof) such as described elsewhere herein.

The exemplary method can include the operations of block 1110, where the network node can send, to the UE, one or more measurement configurations that include values, of at least one parameter, that are associated with a plurality of different traffic types. The exemplary method can also include the operations of block 1140, where the network node can communicate, with the UE, data associated with a particular traffic type. The data being communicated can be UL data, DL data, or a combination thereof.

In some embodiments, the exemplary method can also include the operations of block 1160, where the network node can receive, from the UE, one or more measurements made by the UE on DL signals from the wireless network. In particular, the measurements can be based on one of the measurement configurations that includes values, of the at least one parameter, that are associated with the particular traffic type. In some of these embodiments, one or more of the following are based on the values, of the at least one parameter, that are associated with the particular traffic type:

an event when the received measurements were initiated by the UE;

an event when the received measurements were sent by the UE; and a periodicity at which the measurements are received.

In some embodiments, the exemplary method can also include the operations of blocks 1120-1130. In block 1120, the network node can select a measurement configuration based on the particular traffic type. The selected measurement configuration includes the values, of the at least one parameter, that are associated with the particular traffic type. In block 1130, the network node can send an indication of the selected measurement configuration to the UE. As explained above, this arrangement can be beneficial for DL-heavy scenarios in which the network has access to more information from which to determine traffic type.

In some embodiments, the exemplary method can also include the operations of block 1170, where the network node can, based on the measurements (e.g., received in block 1160), perform a mobility operation for the UE towards a target cell.

In some embodiments, the one or more measurement configurations (e.g., sent to the UE in block 1110) can include a single measurement configuration including a plurality of different values, of the at least one parameter, that are associated with a respective plurality of traffic types.

In other words, the measurement configuration can provide values of the at least one parameter for each of the plurality of traffic types, such as in the examples discussed above.

In other of these embodiments, the one or more measurement configurations can include a plurality of measurement configurations having a respective plurality of different values, of the at least one parameter, that are associated with a respective plurality of traffic types. In other words, the different measurement configurations have traffic-type-specific values of the at least one parameter, such as in other examples discussed above.

In some embodiments, the exemplary method can also include the operations of block 1150, where the network node can determine the particular traffic type for the data based on one or more metrics calculated by the network node based on the data and/or on one or more explicit identifiers associated with the data. In other words, the network node can determine the traffic type in a similar manner as the UE, discussed above. This may be needed in some scenarios but is not required (optional).

In some of these embodiments, the determining operations in block 1150 can include the operations of sub-blocks 1151-1152. In sub-block 1151, the network node can determine the traffic type to be a first traffic type (e.g., eMBB) when the one or more calculated metrics are in a first range of values. In sub-block 1152, the network node can determine the traffic type to be a second traffic type (e.g., XR) when the one or more calculated metrics are in a second range of values, the second range being different than (e.g., partially- or non-overlapping with) the first range. Some exemplary ranges were discussed above.

In some of these embodiments, the calculated metrics can include any of the following: data rate metrics, traffic pattern metrics, and quality-of-service (QoS) metrics. In some embodiments, the traffic pattern metrics can include one or more statistics for any of the following over a previous duration:

number of data packets communicated;

inter-arrival time of data packets communicated;

size of data packets communicated; and radio resource utilization.

In some embodiments, the data rate metrics can include one or more data rate statistics for any of the following over a previous duration: the UE; a service provided by the UE; one or more data radio bearers (DRB); and one or more logical channels (LCH). In some embodiments, the QoS metrics can include one or more statistics for any of the following over a previous duration: physical-layer (PHY) block error rate (BLER), transport BLER, frame error rate (FER), packet loss rate, and timing of successfully received protocol data units (PDUs) or packets.

In some embodiments, the explicit identifiers associated with the data include any of the following: the traffic type; one or more data radio bearers (DRB); one or more logical channels (LCH); and one or more QoS flows (QFI). Any of these can be used by the network node for determining the traffic type in block 1150.

In some embodiments, the plurality of traffic types include enhanced mobile broadband (eMBB) service and extended reality (XR) service. Each parameter, of the at least one parameter, includes respective values that are associated with the eMBB service and the XR service.

In other embodiments, the plurality of traffic types include a plurality of different extended XR services (e.g., VR, AR, etc.). Each parameter, of the at least one parameter, includes respective values that are associated with the plurality of different XR services. In some variants, the plurality of traffic types can also include eMBB service, such that each parameter, of the at least one parameter, includes a further value that is associated with the eMBB service.

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 12:
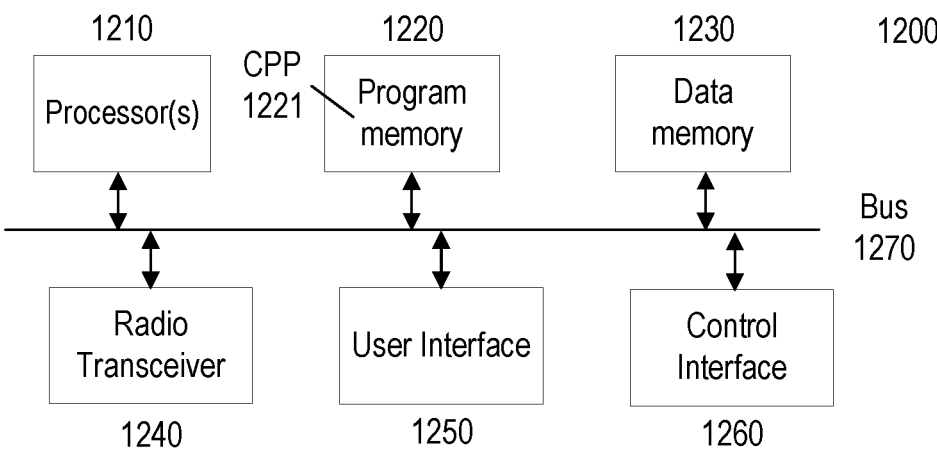
FIG. 12 shows a block diagram of an exemplary wireless device or UE, according to various embodiments of the present disclosure.

FIG. 12 shows a block diagram of an exemplary wireless device or user equipment (UE) 1200 (hereinafter referred to as "UE 1200") according to various embodiments of the present disclosure, including those described above with reference to other figures. For example, UE 1200 can be configured by execution of instructions, stored on a computer-readable medium, to perform operations corresponding to one or more of the exemplary methods described herein.

UE 1200 can include a processor 1210 (also referred to as "processing circuitry") that can be operably connected to a program memory 1220 and/or a data memory 1230 via a bus 1270 that can comprise parallel address and data buses, serial ports, or other methods and/or structures known to those of ordinary skill in the art. Program memory 1220 can store software code, programs, and/or instructions (collectively shown as computer program product 1221 in FIG. 12) that, when executed by processor 1210, can configure and/or facilitate UE 1200 to perform various operations, including operations corresponding to various exemplary methods described herein. As part of or in addition to such operations, execution of such instructions can configure and/or facilitate UE 1200 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1240, user interface 1250, and/or control interface 1260.

As another example, processor 1210 can execute program code stored in program memory 1220 that corresponds to MAC, RLC, PDCP, SDAP, RRC, and NAS layer protocols standardized by 3GPP (e.g., for NR and/or LTE). As a further example, processor 1210 can execute program code stored in program memory 1220 that, together with radio transceiver 1240, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1210 can execute program code stored in program memory 1220 that, together with radio transceiver 1240, implements device-to-device (D2D) communications with other compatible devices and/or UEs.

Program memory 1220 can also include software code executed by processor 1210 to control the functions of UE 1200, including configuring and controlling various components such as radio transceiver 1240, user interface 1250, and/or control interface 1260. Program memory 1220 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1220 can comprise an external storage arrangement (not shown) remote from UE 1200, from which the instructions can be downloaded into program memory 1220 located within or removably coupled to UE 1200, so as to enable execution of such instructions.

Data memory 1230 can include memory area for processor 1210 to store variables used in protocols, configuration, control, and other functions of UE 1200, including operations corresponding to, or comprising, any of the exemplary methods described herein. Moreover, program memory 1220 and/or data memory 1230 can include non-volatile memory (e.g., flash memory), volatile memory (e.g., static or dynamic RAM), or a combination thereof. Furthermore, data memory 1230 can comprise a memory slot by which removable memory cards in one or more formats (e.g., SD Card, Memory Stick, Compact Flash, etc.) can be inserted and removed.

Persons of ordinary skill will recognize that processor 1210 can include multiple individual processors (including, e.g., multi-core processors), each of which implements a portion of the functionality described above. In such cases, multiple individual processors can be commonly connected to program memory 1220 and data memory 1230 or individually connected to multiple individual program memories and or data memories. More generally, persons of ordinary skill in the art will recognize that various protocols and other functions of UE 1200 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1240 can include radio-frequency transmitter and/or receiver functionality that facilitates the UE 1200 to communicate with other equipment supporting like wireless communication standards and/or protocols. In some embodiments, the radio transceiver 1240 includes one or more transmitters and one or more receivers that enable UE 1200 to communicate according to various protocols and/or methods proposed for standardization by 3GPP and/or other standards bodies. For example, such functionality can operate cooperatively with processor 1210 to implement a PHY layer based on OFDM, OFDMA, and/or SC-FDMA technologies, such as described herein with respect to other figures.

In some embodiments, radio transceiver 1240 includes one or more transmitters and one or more receivers that can facilitate the UE 1200 to communicate with various LTE, LTE-Advanced (LTE-A), and/or NR networks according to standards promulgated by 3GPP. In some embodiments of the present disclosure, the radio transceiver 1240 includes circuitry, firmware, etc. necessary for the UE 1200 to communicate with various NR, NR-U, LTE, LTE-A, LTE-LAA, UMTS, and/or GSM/EDGE networks, also according to 3GPP standards. In some embodiments, radio transceiver 1240 can include circuitry supporting D2D communications between UE 1200 and other compatible devices.

In some embodiments, radio transceiver 1240 includes circuitry, firmware, etc. necessary for the UE 1200 to communicate with various CDMA2000 networks, according to 3GPP2 standards. In some embodiments, the radio transceiver 1240 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1240 can include a transceiver that is capable of wired communication, such as by using IEEE 802.3 Ethernet technology. The functionality particular to each of these embodiments can be coupled with and/or controlled by other circuitry in the UE 1200, such as the processor 1210 executing program code stored in program memory 1220 in conjunction with, and/or supported by, data memory 1230.

User interface 1250 can take various forms depending on the particular embodiment of UE 1200 or can be absent from UE 1200 entirely. In some embodiments, user interface 1250 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1200 can comprise a tablet computing device including a larger touchscreen display. In such embodiments, one or more of the mechanical features of the user interface 1250 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1200 can be a digital computing device, such as a laptop computer, desktop computer, workstation, etc. that comprises a mechanical keyboard that can be integrated, detached, or detachable depending on the particular embodiment. Such a digital computing device can also comprise a touch screen display. Many embodiments of the UE 1200 having a touch screen display are capable of receiving user inputs, such as inputs related to exemplary methods described herein or otherwise known to persons of ordinary skill.

In some embodiments, UE 1200 can include an orientation sensor, which can be used in various ways by features and functions of UE 1200. For example, the UE 1200 can use outputs of the orientation sensor to determine when a user has changed the physical orientation of the UE 1200's touch screen display. An indication signal from the orientation sensor can be available to any application program executing on the UE 1200, such that an application program can change the orientation of a screen display (e.g., from portrait to landscape) automatically when the indication signal indicates an approximate 90-degree change in physical orientation of the device.

In this exemplary manner, the application program can maintain the screen display in a manner that is readable by the user, regardless of the physical orientation of the device. In addition, the output of the orientation sensor can be used in conjunction with various embodiments of the present disclosure.

A control interface 1260 of the UE 1200 can take various forms depending on the particular embodiment of UE 1200 and of the particular interface requirements of other devices that the UE 1200 is intended to communicate with and/or control. For example, the control interface 1260 can comprise an RS-232 interface, a USB interface, an HDMI interface, a Bluetooth interface, an IEEE ("Firewire") interface, an I²C interface, a PCMCIA interface, or the like. In some embodiments of the present disclosure, control interface 1260 can comprise an IEEE 802.3 Ethernet interface such as described above. In some embodiments of the present disclosure, the control interface 1260 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1200 can comprise more functionality than is shown in FIG. 12 including, for example, a video and/or still-image camera, microphone, media player and/or recorder, etc. Moreover, radio transceiver 1240 can include circuitry necessary to communicate using additional radio-frequency communication standards including Bluetooth, GPS, and/or others. Moreover, the processor 1210 can execute software code stored in the program memory 1220 to control such additional functionality. For example, directional velocity and/or position estimates output from a GPS receiver can be available to any application program executing on the UE 1200, including any program code corresponding to and/or embodying any embodiments (e.g., of methods) described herein.

Figure 13:
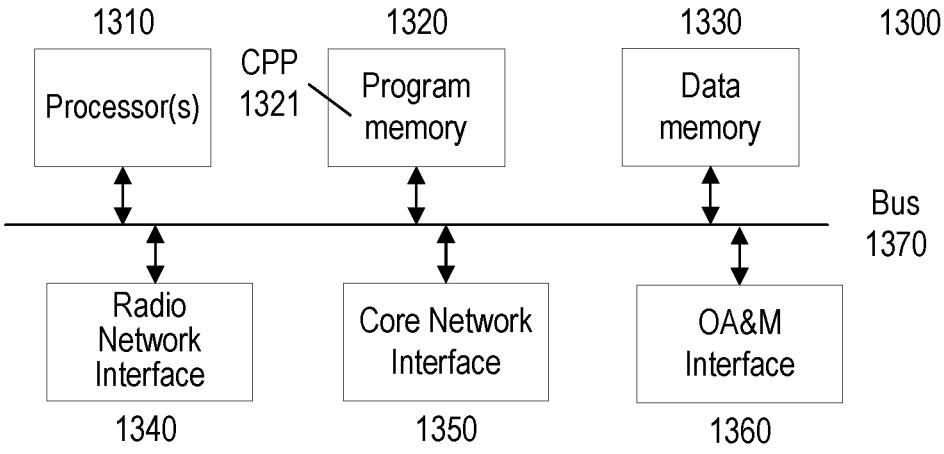
FIG. 13 shows a block diagram of an exemplary network node according to various embodiments of the present disclosure.

FIG. 13 shows a block diagram of an exemplary network node 1300 according to various embodiments of the present disclosure, including those described above with reference to other figures. For example, exemplary network node 1300 can be configured by execution of instructions, stored on a computer-readable medium, to perform operations corresponding to one or more of the exemplary methods described herein. In some embodiments, network node 1300 can comprise a base station, eNB, gNB, or one or more components thereof. For example, network node 1300 can be configured as a central unit (CU) and one or more distributed units (DUs) according to NR gNB architectures specified by 3GPP. More generally, the functionally of network node 1300 can be distributed across various physical devices and/or functional units, modules, etc.

Network node 1300 can include processor 1310 (also referred to as "processing circuitry") that is operably connected to program memory 1320 and data memory 1330 via bus 1370, which can include parallel address and data buses, serial ports, or other methods and/or structures known to those of ordinary skill in the art.

Program memory 1320 can store software code, programs, and/or instructions (collectively shown as computer program product 1321 in FIG. 13) that, when executed by processor 1310, can configure and/or facilitate network node 1300 to perform various operations, including operations corresponding to various exemplary methods described herein. As part of and/or in addition to such operations, program memory 1320 can also include software code executed by processor 1310 that can configure and/or facilitate network node 1300 to communicate with one or more other UEs or network nodes using other protocols or protocol layers, such as one or more of the PHY, MAC, RLC, PDCP, SDAP, RRC, and NAS layer protocols standardized by 3GPP for LTE, LTE-A, and/or NR, or any other higher-layer protocols utilized in conjunction with radio network interface 1340 and/or core network interface 1350. By way of example, core network interface 1350 can comprise the S1 or NG interface and radio network interface 1340 can comprise the Uu interface, as standardized by 3GPP. Program memory 1320 can also comprise software code executed by processor 1310 to control the functions of network node 1300, including configuring and controlling various components such as radio network interface 1340 and core network interface 1350.

Data memory 1330 can comprise memory area for processor 1310 to store variables used in protocols, configuration, control, and other functions of network node 1300. As such, program memory 1320 and data memory 1330 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1310 can include multiple individual processors (not shown), each of which implements a portion of the functionality described above. In such case, multiple individual processors may be commonly connected to program memory 1320 and data memory 1330 or individually connected to multiple individual program memories and/or data memories. More generally, persons of ordinary skill will recognize that various protocols and other functions of network node 1300 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1340 can comprise transmitters, receivers, signal processors, ASICs, antennas, beamforming units, and other circuitry that enables network node 1300 to communicate with other equipment such as, in some embodiments, a plurality of compatible user equipment (UE). In some embodiments, interface 1340 can also enable network node 1300 to communicate with compatible satellites of a satellite communication network. In some embodiments, radio network interface 1340 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1340. According to further embodiments of the present disclosure, the radio network interface 1340 can comprise a PHY layer based on OFDM, OFDMA, and/or SC-FDMA technologies. In some embodiments, the functionality of such a PHY layer can be provided cooperatively by radio network interface 1340 and processor 1310 (including program code in memory 1320).

Core network interface 1350 can comprise transmitters, receivers, and other circuitry that enables network node 1300 to communicate with other equipment in a core network such as, in some embodiments, circuit-switched (CS) and/or packet-switched Core (PS) networks. In some embodiments, core network interface 1350 can comprise the S1 interface standardized by 3GPP. In some embodiments, core network interface 1350 can comprise the NG interface standardized by 3GPP. In some embodiments, core network interface 1350 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1350 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1300 can include hardware and/or software that configures and/or facilitates network node 1300 to communicate with other network nodes in a RAN, such as with other eNBs, gNBs, ng-eNBs, en-gNBs, IAB nodes, etc. Such hardware and/or software can be part of radio network interface 1340 and/or core network interface 1350, or it can be a separate functional unit (not shown). For example, such hardware and/or software can configure and/or facilitate network node 1300 to communicate with other RAN nodes via the X2 or Xn interfaces, as standardized by 3GPP.

OA&M interface 1360 can comprise transmitters, receivers, and other circuitry that enables network node 1300 to communicate with external networks, computers, databases, and the like for purposes of operations, administration, and maintenance of network node 1300 or other network equipment operably connected thereto. Lower layers of OA&M interface 1360 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1340, core network interface 1350, and OA&M interface 1360 may be multiplexed together on a single physical interface, such as the examples listed above.

Figure 14:
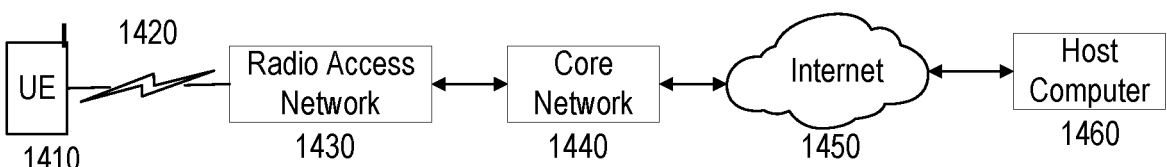
FIG. 14 shows a block diagram of an exemplary network configured to provide over-the-top (OTT) data services between a host computer and a UE, according to various embodiments of the present disclosure.

FIG. 14 is a block diagram of an exemplary communication network configured to provide over-the-top (OTT) data services between a host computer and a user equipment (UE), according to one or more embodiments of the present disclosure. UE 1410 can communicate with radio access network (RAN) 1430 over radio interface 1420, which can be based on protocols described above including, e.g., LTE, LTE-A, and 5G/NR. For example, UE 1410 can be configured and/or arranged as shown in other figures discussed above.

RAN 1430 can include one or more network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1430 can cooperatively operate using licensed and unlicensed spectrum. In some embodiments, RAN 1430 can include, or be capable of communication with, one or more satellites comprising a satellite access network.

RAN 1430 can further communicate with core network 1440 according to various protocols and interfaces described above. For example, one or more apparatus (e.g., base stations, eNBs, gNBs, etc.) comprising RAN 1430 can communicate to core network 1440 via core network interface 1450 described above. In some embodiments, RAN 1430 and core network 1440 can be configured and/or arranged as shown in other figures discussed above. For example, eNBs comprising an evolved UTRAN (E-UTRAN) 1430 can communicate with an evolved packet core (EPC) network 1440 via an S1 interface. As another example, gNBs and ng-eNBs comprising an NG-RAN 1430 can communicate with a 5GC network 1430 via an NG interface.

Core network 1440 can further communicate with an external packet data network, illustrated in FIG. 14 as Internet 1450, according to various protocols and interfaces known to persons of ordinary skill in the art. Many other devices and/or networks can also connect to and communicate via Internet 1450, such as exemplary host computer 1460. In some embodiments, host computer 1460 can communicate with UE 1410 using Internet 1450, core network 1440, and RAN 1430 as intermediaries. Host computer 1460 can be a server (e.g., an application server) under ownership and/or control of a service provider. Host computer 1460 can be operated by the OTT service provider or by another entity on the service provider's behalf.

For example, host computer 1460 can provide an over-the-top (OTT) packet data service to UE 1410 using facilities of core network 1440 and RAN 1430, which can be unaware of the routing of an outgoing/incoming communication to/from host computer 1460. Similarly, host computer 1460 can be unaware of routing of a transmission from the host computer to the UE, e.g., the routing of the transmission through RAN 1430. Various OTT services can be provided using the exemplary configuration shown in FIG. 14 including, e.g., streaming (unidirectional) audio and/or video from host computer to UE, interactive (bidirectional) audio and/or video between host computer and UE, interactive messaging or social communication, interactive virtual or augmented reality, cloud gaming, etc.

The exemplary network shown in FIG. 14 can also include measurement procedures and/or sensors that monitor network performance metrics including data rate, latency and other factors that are improved by embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The embodiments described herein provide flexible and efficient techniques whereby a UE can trigger measurement reporting based on one or more parameters (e.g., signal thresholds) that depend on the type of traffic or service(s) that UE is currently providing (e.g., to the end-user) or consuming (e.g., from the network). These techniques can enhance mobility performance and/or service continuity for XR service users, such as by facilitating changes to a UE's serving cell before XR QoS/QoE becomes unacceptable, e.g., due to aggregate traffic load increase in the serving cell. These techniques can also facilitate reuse of existing handover procedures in the network albeit with improvements for emerging XR services.

When used in NR UEs (e.g., UE 1410) and gNBs (e.g., gNBs comprising RAN 1430), these improvements can increase the use of OTT data services—including XR applications—by providing better QoS/QoE to OTT service providers and end users. Consequently, this increases the benefits and/or value of such data services to end users and OTT service providers.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the techniques and apparatus described herein also include, but are not limited to, the following enumerated examples:

A1. A method for a user equipment (UE) configured communicate data corresponding to multiple traffic types with a wireless network, the method comprising:
 determining a traffic type associated with data currently, or most recently, being communicated with the wireless network;
 selecting a measurement configuration based on the determined traffic type, wherein the selected measurement configuration includes at least one parameter that has a value associated with the determined traffic type; and
 performing radio resource management (RRM) measurements on downlink (DL) signals from the wireless network according to the selected measurement configuration, including performing at least one operation based on the value associated with the determined traffic type.

A2. The method of embodiment A1, wherein the at least one operation based on the value associated with the determined traffic type includes:
 initiating a measurement based on an event corresponding to the value;

reporting a measurement to the wireless network based on an event corresponding to the value; and periodically reporting a measurement to the wireless network based on a periodicity corresponding to the value.

A3. The method of any of embodiments A1-A2, further comprising receiving, from the wireless network, one or more measurement configurations that include at least one parameter having respective values associated with respective traffic types, wherein the measurement configuration is selected from the received one more measurement configuration.

A4. The method of embodiment A3, wherein the one or more measurement configurations include a single measurement configuration having respective values, of the at least one parameter, associated with the respective traffic types.

A5. The method of embodiment A4, wherein the one or more measurement configurations include a plurality of measurement configurations having a respective plurality of values, of the at least one parameter, associated with the respective traffic types.

A6. The method of any of embodiments A1-A5, wherein determining the traffic type is based on one or more of the following:

one or more metrics calculated by the UE based on the data; and one or more explicit identifiers associated with the data.

A7. The method of embodiment A6, wherein determining the traffic type comprises:

determining the traffic type to be a first traffic type when the one or more calculated metrics are in a first range of values; and determining the traffic type to be a second traffic type when the one or more calculated metrics are in a second range of values, the second range being different than the first range.

A8. The method of any of embodiments A6-A7, wherein the calculated metrics include any of the following: data rate, traffic pattern, and quality-of-service (QoS).

A9. The method of embodiment A8, wherein the traffic pattern metrics include one or more statistics for any of the following over a previous duration:

number and/or size of data packets communicated; and radio resource utilization.

A10. The method of embodiment A8, wherein the data rate metrics include one or more data rate statistics for any of the following over a previous duration: the UE; a service provided by the UE; one or more data radio bearers (DRB); and one or more logical channels (LCH).

A11. The method of embodiment A8, wherein the QoS metrics include one or more statistics for any of the following over a previous duration: physical-layer (PHY) block error rate (BLER), transport BLER, frame error rate (FER), packet loss rate, and timing of successfully received protocol data units (PDUs) or packets.

A12. The method of any of embodiments A6-A11, wherein the explicit identifiers associated with the data include any of the following: the traffic type; one or more data radio bearers (DRB); one or more logical channels (LCH); and one or more QoS flows (QFI).

A13. The method of any of embodiments A1-A12, wherein:

the multiple traffic types include enhanced mobile broadband (eMBB) service and extended reality (XR) service; and each parameter, of the at least one parameter, includes respective values that are associated with eMBB and XR.

A14. The method of any of embodiments A1-A12, wherein:

the multiple traffic types include a plurality of different extended reality (XR) services; and each parameter, of the at least one parameter, includes respective values that are associated with each of the different XR services.

A15. The method of embodiment A14, wherein:

the multiple traffic types also include enhanced mobile broadband (eMBB) service; and each parameter, of the at least one parameter, includes a further value that is associated with eMBB.

B1. A method for a network node, in a wireless network, configured communicate data corresponding to multiple traffic types with a user equipment (UE), the method comprising:

sending, to the UE, one or more measurement configurations that include at least one parameter having respective values that are associated with respective traffic types; and communicating, with the UE, data associated with a particular traffic type; and receiving, from the UE, radio resource management (RRM) measurements on downlink (DL) signals from the wireless network, wherein the measurements are based on a measurement configuration having a value, of the at least one parameter, associated with the particular traffic type.

B2. The method of embodiment B1, wherein the received measurements are based on the UE performing at least one of the following:

initiating a measurement based on an event corresponding to the value associated with the particular traffic type;

reporting a measurement to the wireless network based on an event corresponding to the value associated with the particular traffic type; and periodically reporting a measurement to the wireless network based on a periodicity corresponding to the value associated with the particular traffic type.

B3. The method of any of embodiments B1-B2, further comprising:

selecting a measurement configuration based on the particular traffic type, wherein the selected measurement configuration includes the value of the at least one parameter; and sending an indication of the selected measurement configuration to the UE.

B4. The method of any of embodiments B1-B3, wherein the one or more measurement configurations include a single measurement configuration having respective values, of the at least one parameter, associated with the respective traffic types.

B5. The method of any of embodiments B1-B3, wherein the one or more measurement configurations include a plurality of measurement configurations having a respective plurality of values, of the at least one parameter, associated with the respective traffic types.

B6. The method of any of embodiments B1-B5, further comprising determining the particular traffic type for the data based on one or more of the following:

one or more metrics calculated by the network node based on the data; and one or more explicit identifiers associated with the data.

B7. The method of embodiment B6, wherein determining the traffic type comprises:

determining the traffic type to be a first traffic type when the one or more calculated metrics are in a first range of values; and determining the traffic type to be a second traffic type when the one or more calculated metrics are in a second range of values, the second range being different than the first range.

B8. The method of any of embodiments B6-B7, wherein the calculated metrics include any of the following: data rate, traffic pattern, and quality-of-service (QoS).

B9. The method of embodiment B8, wherein the traffic pattern metrics includes one or more statistics for any of the following over a previous duration:

number and/or size of data packets communicated; and radio resource utilization.

B10. The method of embodiment B8, wherein the data rate metrics include one or more data rate statistics for any of the following over a previous duration: the UE; a service provided by the UE; one or more data radio bearers (DRB); and one or more logical channels (LCH).

B11. The method of embodiment B8, wherein the QoS metrics include one or more statistics for any of the following over a previous duration: physical-layer (PHY) block error rate (BLER), transport BLER, frame error rate (FER), packet loss rate, and timing of successfully received protocol data units (PDUs) or packets.

B12. The method of any of embodiments B6-B11, wherein the explicit identifiers associated with the data include any of the following: the traffic type; one or more data radio bearers (DRB); one or more logical channels (LCH); and one or more QoS flows (QFI).

B13. The method of any of embodiments B1-B12, wherein:

the multiple traffic types include enhanced mobile broadband (eMBB) service and extended reality (XR) service; and each parameter, of the at least one parameter, includes respective values that are associated with eMBB and XR.

B14. The method of any of embodiments B1-B12, wherein:

the multiple traffic types include a plurality of different extended reality (XR) services; and each parameter, of the at least one parameter, includes respective values that are associated with each of the different XR services.

B15. The method of embodiment B14, wherein:

the multiple traffic types also include enhanced mobile broadband (eMBB) service; and each parameter, of the at least one parameter, includes a further value that is associated with eMBB.

B16. The method of any of embodiments B1-B15, further comprising, based on the RRM measurements, performing a mobility operation for the UE towards a target cell.

C1. A user equipment (UE) configured communicate data corresponding to multiple traffic types with a wireless network, the UE comprising:

radio transceiver circuitry configured to communicate with a network node in the wireless network; and processing circuitry operatively coupled to the radio transceiver circuitry, whereby the processing circuitry and the radio transceiver circuitry are configured to perform operations corresponding to any of the methods of embodiments A1-A15.

C2. A user equipment (UE) configured communicate data corresponding to multiple traffic types with a wireless network, the UE being further configured to perform operations corresponding to any of the methods of embodiments A1-A15.

C3. A non-transitory, computer-readable medium storing computer-executable instructions that, when executed by processing circuitry of a user equipment (UE) configured communicate data corresponding to multiple traffic types with a wireless network, configure the UE to perform operations corresponding to any of the methods of embodiments A1-A15.

C4. A computer program product comprising computer-executable instructions that, when executed by processing circuitry of a user equipment (UE) configured communicate data corresponding to multiple traffic types with a wireless network, configure the UE to perform operations corresponding to any of the methods of embodiments A1-A15.

D1. A network node, in a wireless network, configured communicate data corresponding to multiple traffic types with a user equipment (UE), the network node comprising:

radio network interface circuitry configured to communicate with the UE; and processing circuitry operatively coupled to the radio network interface circuitry, whereby the processing circuitry and the radio network interface circuitry are configured to perform operations corresponding to any of the methods of embodiments B1-B15.

D2. A network node, in a wireless network, configured communicate data corresponding to multiple traffic types with a user equipment (UE), the network node being further configured to perform operations corresponding to any of the methods of embodiments B1-B15.

D3. A non-transitory, computer-readable medium storing computer-executable instructions that, when executed by processing circuitry of network node, in a wireless network, configured communicate data corresponding to multiple traffic types with a user equipment (UE), configure the network node to perform operations corresponding to any of the methods of embodiments B1-B15.

D4. A computer program product comprising computer-executable instructions that, when executed by processing circuitry of network node, in a wireless network, configured communicate data corresponding to multiple traffic types with a user equipment (UE), configure the network node to perform operations corresponding to any of the methods of embodiments B1-B15.

The invention claimed is:

1. A method for a user equipment (UE) configured to communicate data corresponding to multiple traffic types with a network node of a wireless network, the method comprising:

receiving, from the wireless network, one or more measurement configurations that include values, of at least one parameter, that are associated with a plurality of different traffic types, wherein:

the plurality of traffic types include at least one enhanced mobile broadband (eMBB) service and at least one extended reality (XR) service; and each parameter, of the at least one parameter, includes respective values that are associated with respective services of the at least one eMBB service and the at least one XR service;

determining a traffic type associated with data communicated between the UE and the network node;

selecting a measurement configuration from the received one or more measurement configurations based on the determined traffic type, wherein the selected measurement configuration includes values, of the at least one parameter, that are associated with the determined traffic type; and performing one or more measurements on downlink (DL) signals from the wireless network according to the selected measurement configuration.

2. The method of claim 1, wherein performing the one or more measurements comprises performing one or more of the following operations based on the values, of the at least one parameter, that are associated with the determined traffic type:

initiating a measurement based on an event corresponding to the values, of the at least one parameter, that are associated with the determined traffic type;

reporting a measurement to the wireless network based on an event corresponding to the values, of the at least one parameter, that are associated with the determined traffic type; and periodically reporting a measurement to the wireless network based on a periodicity corresponding to the values, of the at least one parameter, that are associated with the determined traffic type.

3. The method of claim 1, wherein the one or more measurement configurations include one of the following:

a single measurement configuration including a plurality of different values, of the at least one parameter, that are associated with a respective plurality of traffic types; or a plurality of measurement configurations having a respective plurality of different values, of the at least one parameter, that are associated with a respective plurality of traffic types.

4. The method of claim 1, wherein determining the traffic type comprises:

determining the traffic type to be a first traffic type when one or more metrics calculated by the UE based on the data are in a first range of values; and determining the traffic type to be a second traffic type when the one or more metrics calculated by the UE based on the data are in a second range of values, the second range being different than the first range.

5. The method of claim 4, wherein the calculated metrics include one or more statistics for any of the following over a previous duration:

number of data packets communicated;
inter-arrival time of data packets communicated;
size of data packets communicated; and
radio resource utilization.

6. The method of claim 4, wherein the calculated metrics include one or more of the following:

one or more data rate statistics for any of the following over a previous duration: the UE, a service provided by the UE, one or more data radio bearers (DRBs), and one or more logical channels (LCHs); and one or more statistics for any of the following over a previous duration: physical-layer (PHY) block error rate (BLER), transport BLER, frame error rate (FER), packet loss rate, and timing of successfully received packets or protocol data units (PDUs).

7. The method of claim 1, wherein determining the traffic type is based on one or more explicit identifiers associated with the data, wherein the explicit identifiers associated with the data include identifiers of any of the following: the traffic type, one or more data radio bearers (DRBs), one or more logical channels (LCHs), and one or more QoS flows (QFIs).

8. A method for a network node configured to communicate data corresponding to multiple traffic types with a user equipment, UE, in a wireless network, the method comprising:

sending, to the UE, one or more measurement configurations that include values, of at least one parameter, that are associated with a plurality of different traffic types, wherein:

the plurality of traffic types include at least one enhanced mobile broadband (eMBB) service and at least one extended reality (XR) service; and each parameter, of the at least one parameter, includes respective values that are associated with respective services of the at least one eMBB service and the at least one XR service;

communicating, with the UE, data associated with a particular one of the traffic types; and receiving, from the UE, one or more measurements made by the UE on downlink (DL) signals from the wireless network, wherein the received measurements are based on one of the measurement configurations that includes values, of the at least one parameter, that are associated with the particular traffic type.

9. The method of claim 8, wherein one or more of the following are based on the values, of the at least one parameter, that are associated with the particular traffic type:

an event when the received measurements were initiated by the UE;

an event when the received measurements were sent by the UE; and a periodicity at which the measurements are received.

10. The method of claim 8, further comprising:

selecting a measurement configuration based on the particular traffic type, wherein the selected measurement configuration includes the values, of the at least one parameter, that are associated with the particular traffic type; and sending an indication of the selected measurement configuration to the UE.

11. The method of claim 8, wherein the one or more measurement configurations include one of the following:

a single measurement configuration including a plurality of different values, of the at least one parameter, that are associated with a respective plurality of traffic types; or a plurality of measurement configurations having a respective plurality of different values, of the at least one parameter, that are associated with a respective plurality of traffic types.

12. The method of claim 8, further comprising determining the particular traffic type associated with the data to be the following:

a first traffic type when one or more metrics calculated by the network node based on the data are in a first range of values; and a second traffic type when the one or more metrics calculated by the network node based on the data are in a second range of values, the second range being different than the first range.

13. The method of claim 12, wherein the calculated metrics include one or more statistics for any of the following over a previous duration:

number of data packets communicated;

inter-arrival time of data packets communicated;

size of data packets communicated; and radio resource utilization.

14. The method of claim 12, wherein the calculated metrics include one or more of the following:

one or more data rate statistics for any of the following over a previous duration: the UE, a service provided by the UE, one or more data radio bearers (DRBs), and one or more logical channels (LCHs); and one or more statistics for any of the following over a previous duration: physical-layer (PHY) block error rate (BLER), transport BLER, frame error rate (FER), packet loss rate, and timing of successfully received packets or protocol data units (PDUs).

15. The method of claim 8, further comprising determining the particular traffic type associated with the data based on one or more explicit identifiers associated with the data, wherein the explicit identifiers associated with the data include identifiers of any of the following: the traffic type, one or more data radio bearers (DRBs), one or more logical channels (LCHs), and one or more QoS flows (QFIs).

16. A network node configured to communicate data corresponding to multiple traffic types with a user equipment (UE) in a wireless network, the network node comprising:

radio network interface circuitry configured to communicate with the UE; and processing circuitry operatively coupled to the radio network interface circuitry, whereby the processing circuitry and the radio network interface circuitry are configured to perform operations corresponding to the method of claim 8.

17. A user equipment (UE) configured to communicate data corresponding to multiple traffic types with a network node of a wireless network, the UE comprising:

radio transceiver circuitry configured to communicate with the network node; and processing circuitry operatively coupled to the radio transceiver circuitry, whereby the processing circuitry and the radio transceiver circuitry are configured to:

receive, from the wireless network, one or more measurement configurations that include values, of at least one parameter, that are associated with a plurality of different traffic types, wherein:

the plurality of traffic types include at least one enhanced mobile broadband (eMBB) service and at least one extended reality (XR) service; and each parameter, of the at least one parameter, includes respective values that are associated with respective services of the at least one eMBB service and the at least one XR service;

determine a traffic type associated with data communicated between the UE and the network node;

select a measurement configuration from the received one or more measurement configurations based on the determined traffic type, wherein the selected measurement configuration includes values, of at least one parameter, that are associated with the determined traffic type; and perform one or more measurements on downlink (DL) signals from the wireless network according to the selected measurement configuration.

\*    \*    \*    \*    \*